(12) United States Patent
Pape et al.

(10) Patent No.: US 7,423,217 B2
(45) Date of Patent: Sep. 9, 2008

(54) DUAL ACTION SEALING GASKET AND USE THEREOF IN A ELECTRICAL HOUSING ASSEMBLY

(75) Inventors: Robert Pape, Winona, MN (US); Larry E. Tiedemann, Winona, MN (US); Theodore T. Von Arx, La Crescent, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 11/706,051

(22) Filed: Feb. 13, 2007

(65) Prior Publication Data

US 2007/0169955 A1 Jul. 26, 2007

Related U.S. Application Data

(63) Continuation-in-part of application No. 11/337,339, filed on Jan. 23, 2006.

(51) Int. Cl.
*H02G 3/08* (2006.01)

(52) U.S. Cl. .............. 174/50; 174/17 CT; 174/358; 174/135; 16/2.1; 16/2.2; 277/910

(58) Field of Classification Search .......... 174/17 CT, 174/18, 668, 480, 50, 53, 57, 506, 650, 669, 174/135, 137 R, 152 G, 153 G, 358, 370, 174/366, 652, 561, 354, 651, 660, 361, 351, 174/377, 152 R; 16/2.1, 2.2; 439/271; 277/606, 277/422, 910, 935, 615, 625, 312; D13/269

See application file for complete search history.

(56) References Cited

U.S. PATENT DOCUMENTS

| | | | | |
|---|---|---|---|---|
| 2,454,567 | A | | 11/1948 | Pierson, Jr. |
| 2,796,457 | A | | 6/1957 | Stinger |
| 4,343,480 | A | * | 8/1982 | Vassallo ............... 277/615 |
| 4,857,668 | A | * | 8/1989 | Buonanno ............ 174/354 |
| 5,068,493 | A | * | 11/1991 | Benn et al. ............ 174/354 |
| 5,403,019 | A | * | 4/1995 | Marshall ............... 277/422 |
| 6,069,317 | A | * | 5/2000 | Wagganer ............. 174/650 |
| 6,116,615 | A | * | 9/2000 | Trehan ................. 174/358 |
| 7,140,618 | B2 | * | 11/2006 | Valls, Jr. ................ 277/625 |
| 2002/0040802 | A1 | | 4/2002 | Yasuda et al. | |

* cited by examiner

*Primary Examiner*—Angel R Estrada
(74) *Attorney, Agent, or Firm*—Brinks Hofer Gilson & Lione

(57) ABSTRACT

A housing assembly is provided that has a case including an open end and a flange extending around at least a portion of the open end. The flange defines at least one reduced area extending into a portion of the flange, and a gasket is disposed around the flange. Preferably, the gasket includes a first sealing portion, a second sealing portion, an internal groove for receiving the flange, and at least one member extending into the internal groove and into the at least one reduced area of the flange. In one form, the reduced area is an aperture, and the member of the gasket is a support that extends all the way through the flanges, thereby providing a secure engagement between the gasket and the case during operation. Methods of manufacturing the housing assembly are also provided.

25 Claims, 39 Drawing Sheets

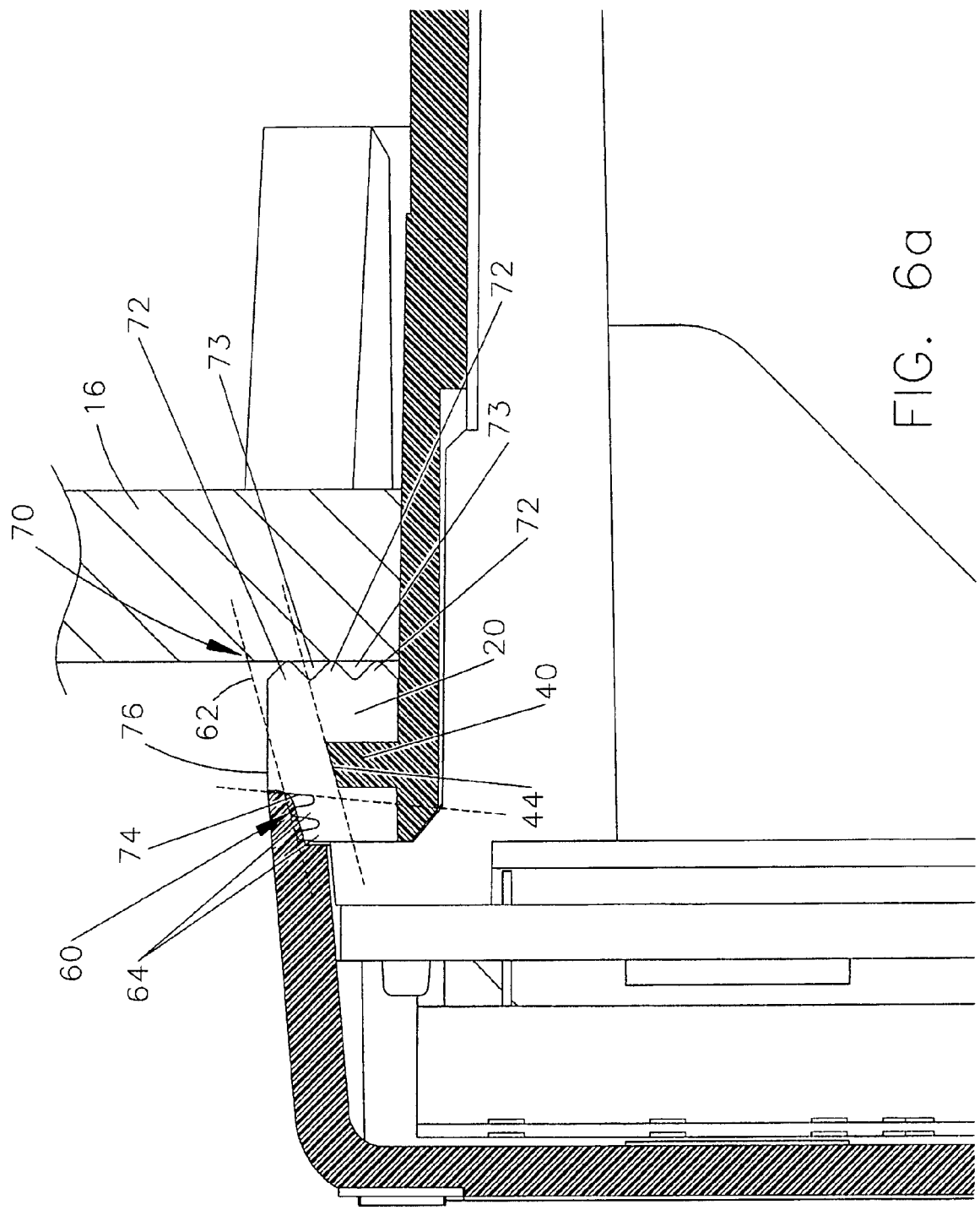

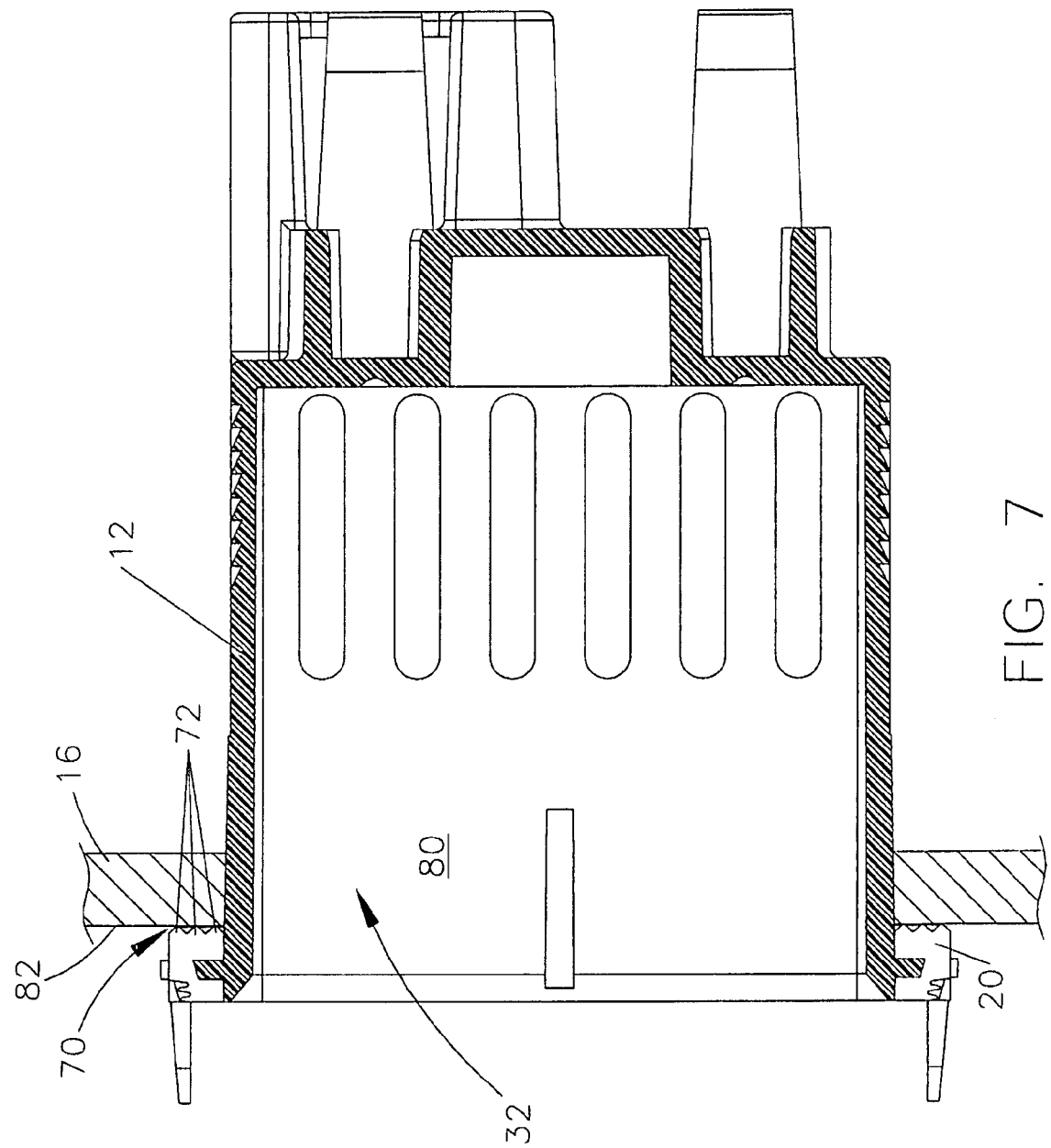

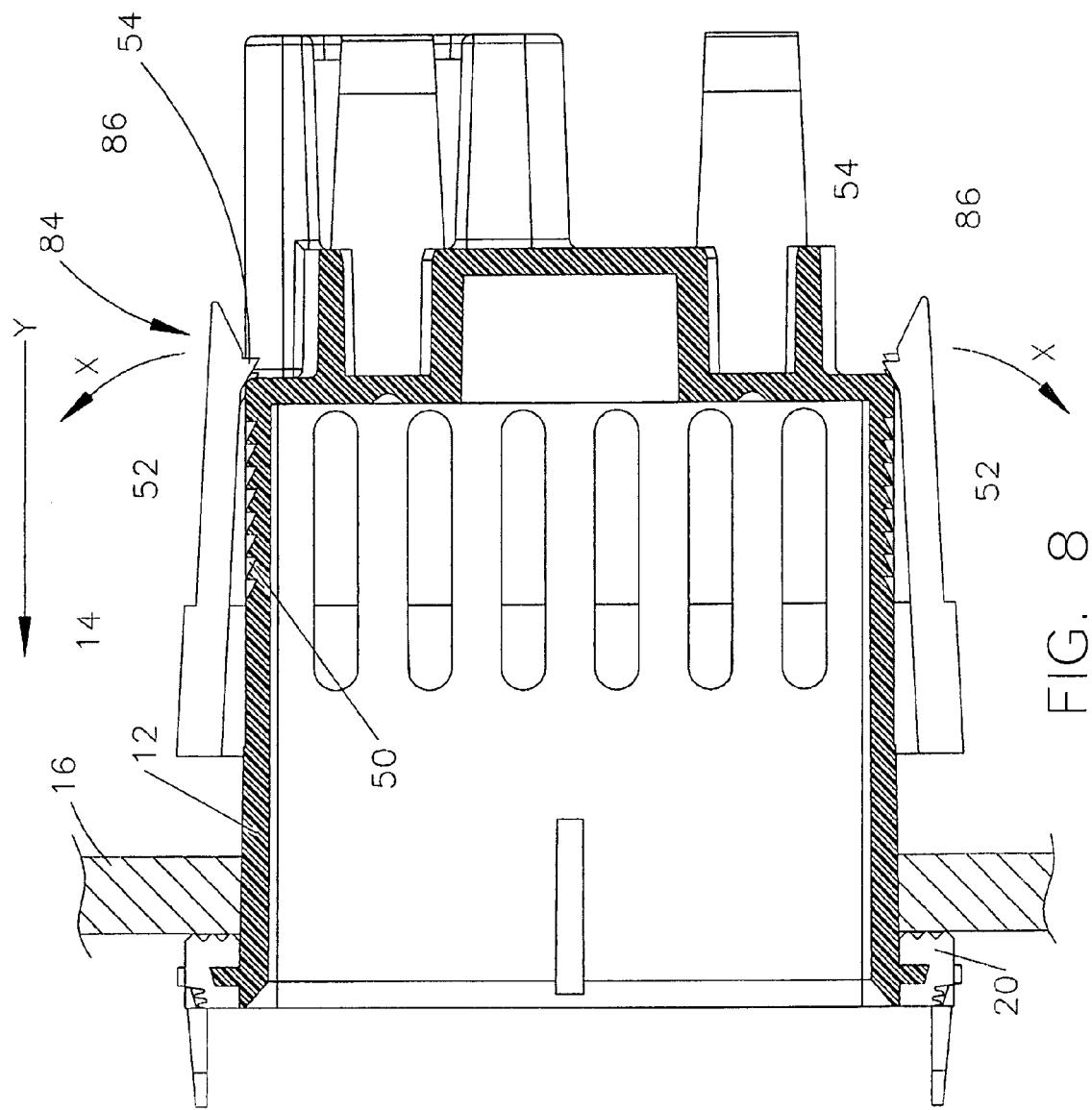

DUAL ACTION SEALING GASKET AND USE THEREOF IN A ELECTRICAL HOUSING ASSEMBLY

CROSS-REFERENCE TO RELATED APPLICATION

The present application is a continuation-in-part application of U.S. application Ser. No. 11/337,339, titled "Dual Action Sealing Gasket and Use Thereof in an Electrical Housing Assembly," filed Jan. 23, 2006, which is hereby incorporated by reference in its entirety.

FIELD

The present disclosure relates generally to sealing gaskets, and more particularly to sealing gaskets used in the mounting of electrical assemblies to panels to prevent moisture from damaging electrical components disposed within enclosures of the electrical assemblies.

BACKGROUND

The statements in this section merely provide background information related to the present disclosure and may not constitute prior art.

A power controller system generally includes a number of electrical enclosure assemblies mounted to a panel, wherein a plurality of electrical and electronic components are disposed within individual enclosures. The enclosure is commonly mounted to the panel on an interior portion, and a cover (or a "bezel" as commonly referred to in the art) is placed over an open end of the enclosure to cover the electrical and electronic components on an exterior portion of the panel. Such a construction often requires the sealing of interfaces between the panel and each of the components of the enclosure assembly, i.e. the bezel on the exterior of the panel and the enclosure on the interior of the panel, to prevent outside moisture from entering the enclosure and possibly damaging the electric and electronic components.

In some electrical applications, the sealing must meet requirements of the National Electrical Manufacturers Association (NEMA), and more specifically NEMA Standard 250, "Enclosures for Electrical Equipment (1000 volts Maximum)." A conventional NEMA sealing arrangement generally requires a sealing member, one of which is commonly referred to as a "NEMA 4X panel gasket," for the interface between the bezel and the panel. One disadvantage of this conventional sealing arrangement is that when the bezel is removed for maintenance purposes, the sealing member becomes dislodged and is often lost or damaged, thus requiring frequent replacement. Another disadvantage is that a relatively large force is often required to properly install the sealing member between the panel and an external component, (e.g., the bezel), to achieve a proper seal. With such large forces, the sealing members often undergo plastic deformation, become brittle, and thus once removed often fail and cannot be re-used.

Additionally, many of the conventional NEMA sealing arrangements require multiple sealing members for a single electrical enclosure installation, depending on the configuration of the external components. The sealing members are also typically secured between the external component and the panel by way of a plurality of mechanical fasteners, which are commonly accessible only from the interior of the panel. The use of multiple mechanical fasteners also results in a somewhat tedious process of installation and removal. Accordingly, a plurality of separate parts are required for a typical electrical enclosure installation, thus increasing the complexity of the installation and also increasing the probability that the separate parts will become lost and/or damaged.

SUMMARY

In one preferred form, a housing assembly is provided that comprises a case including an open end and a flange extending around at least a portion of the open end, and a gasket disposed around the flange. The flange defines at least one aperture extending through a portion of the flange. The gasket includes a first sealing portion, a second sealing portion, an internal groove for receiving the flange, and at least one support extending across the internal groove and through the at least one aperture of the flange.

In another preferred form, a housing assembly is provided that comprises a case comprising a flange extending around at least a portion of the case and a gasket disposed around the flange. The flange defines at least one reduced area extending into a portion of the flange. The gasket comprises an internal groove for receiving the flange and at least one member extending into the internal groove and into the at least one reduced area of the flange.

In yet another form, a gasket is provided that comprises a first sealing portion for providing sealing between the case and a first adjacent component, a second sealing portion for providing sealing between the case and a second adjacent component. The gasket is made of a thermoplastic elastomer having durometer in the range of 25-40.

In still another form, a method of manufacturing a housing assembly is provided that comprises molding a case, the case defining an open end and a flange extending around at least a portion of the open end, the flange defining at least one reduced area, and molding a gasket around the flange of the case such that a material of the gasket extends into the at least one reduced area of the flange.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The present disclosure will become more fully understood from the detailed description and the accompanying drawings, wherein:

FIG. 6a is an enlarged cross-sectional view, taken from detail B of FIG. 4, illustrating a gasket constructed in accordance with the teachings of the present disclosure;

FIG. 7 is a cross-sectional view illustrating a case being inserted through a panel in accordance with the teachings of the present disclosure;

FIG. 8 is a cross-sectional view illustrating a mounting collar disposed around the case in accordance with the teachings of the present disclosure;

Corresponding reference numerals indicate corresponding parts throughout the several views of the drawings.

DETAILED DESCRIPTION

Figure 1:
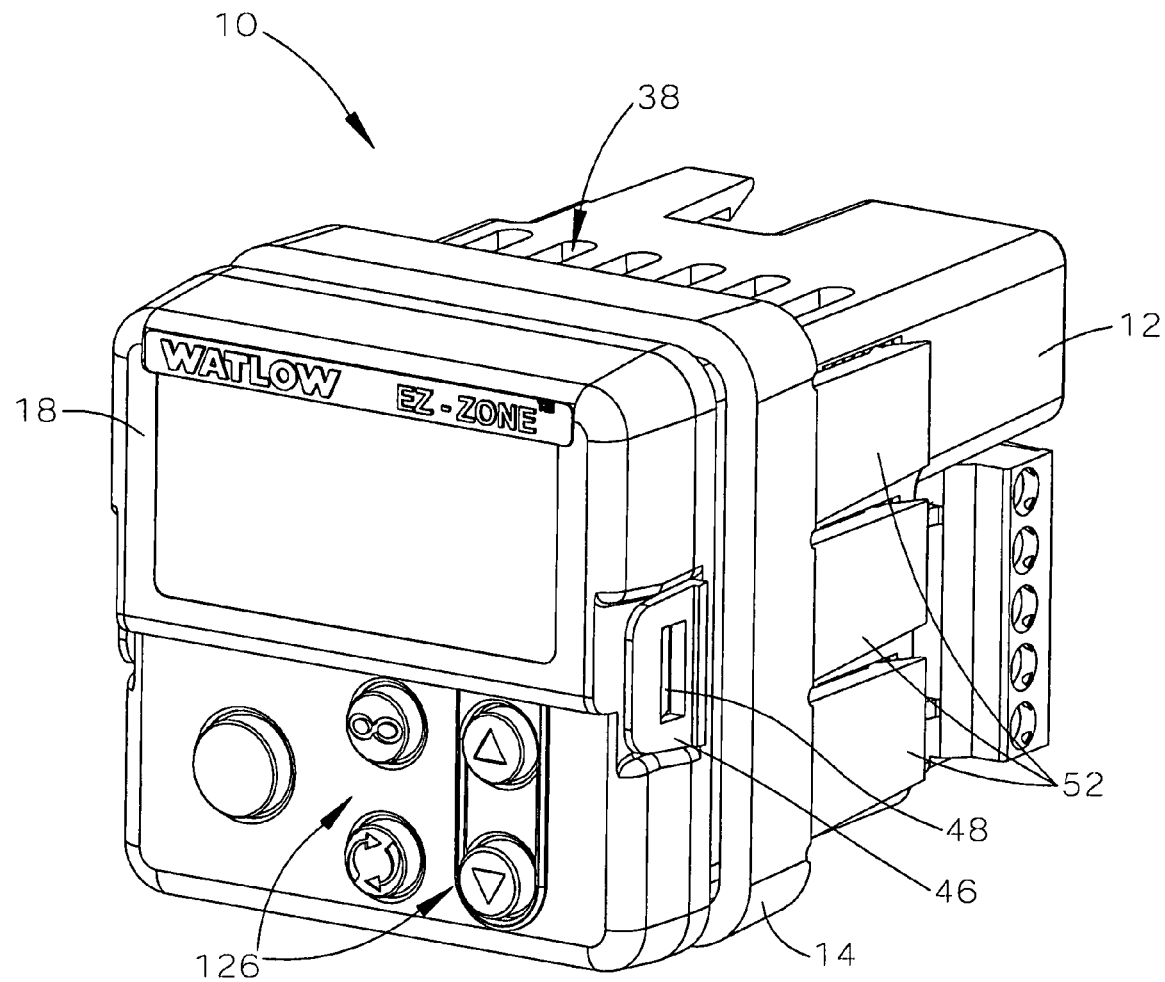
FIG. 1 is a perspective view of a housing assembly constructed in accordance with the teachings of the present disclosure.

The structure and function of various housing assemblies and gaskets in accordance with the teachings of the present disclosure are now described in greater detail. The following description of the illustrated examples is merely exemplary in nature and is in no way intended to limit the disclosure, its application, or uses.

Referring to FIGS. 1 through 5, a housing assembly in accordance with the teachings of the present disclosure is illustrated and generally indicated by reference numeral 10. The housing assembly 10 comprises a case 12 for enclosing electrical components therein, a mounting collar 14 for securing the case to a panel 16 (shown in FIGS. 4 and 5), a cover 18, and a gasket 20 disposed between the panel 16 and the cover 18 to prevent moisture from entering the case 12 and possibly damaging the electrical components.

The case 12 preferably defines a square shape as shown and includes a closed end 30 (FIG. 4) disposed on an interior side of the panel 16 and an open end 32 disposed proximate an exterior of the panel 16. The case 12 further comprises side walls 34 extending between the closed end 30 and the open end 32. An end wall 36 is provided adjacent the closed end 30 of the case 12 for supporting the various electrical components and their connections to other system components (not shown). Additionally, at least one of the side walls 34 preferably comprises openings 38 to allow dissipation of heat generated from the electrical components to the exterior of the case 12. Although the case 12 is illustrated as a square shape, it should be understood that other shapes such as rectangular, circular, elliptical, and other polygonal shapes may also be employed while remaining within the scope of the present disclosure.

Figure 2:
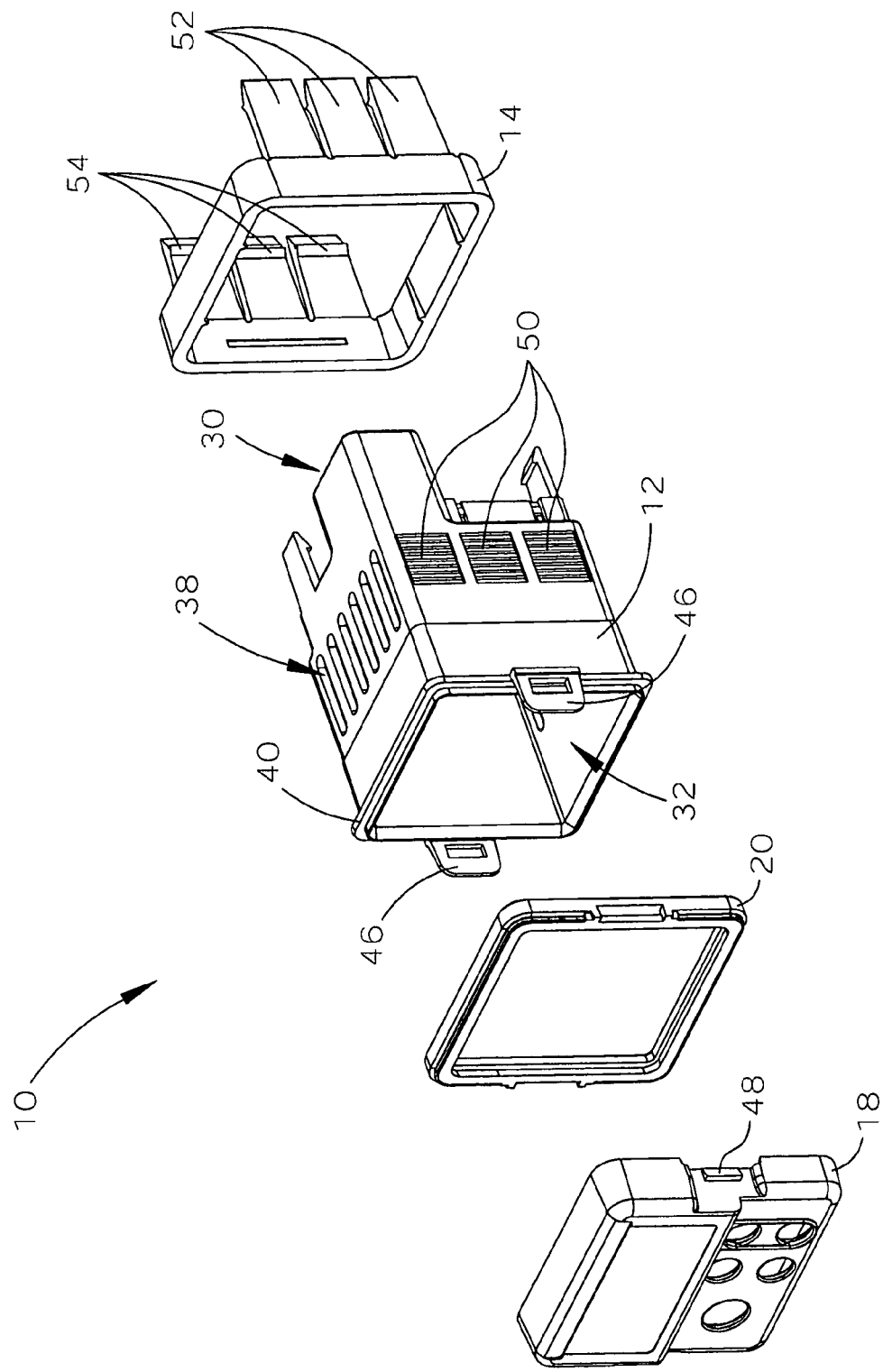
FIG. 2 is an exploded perspective view of the housing assembly in accordance with the teachings of the present disclosure.
Figure 3:
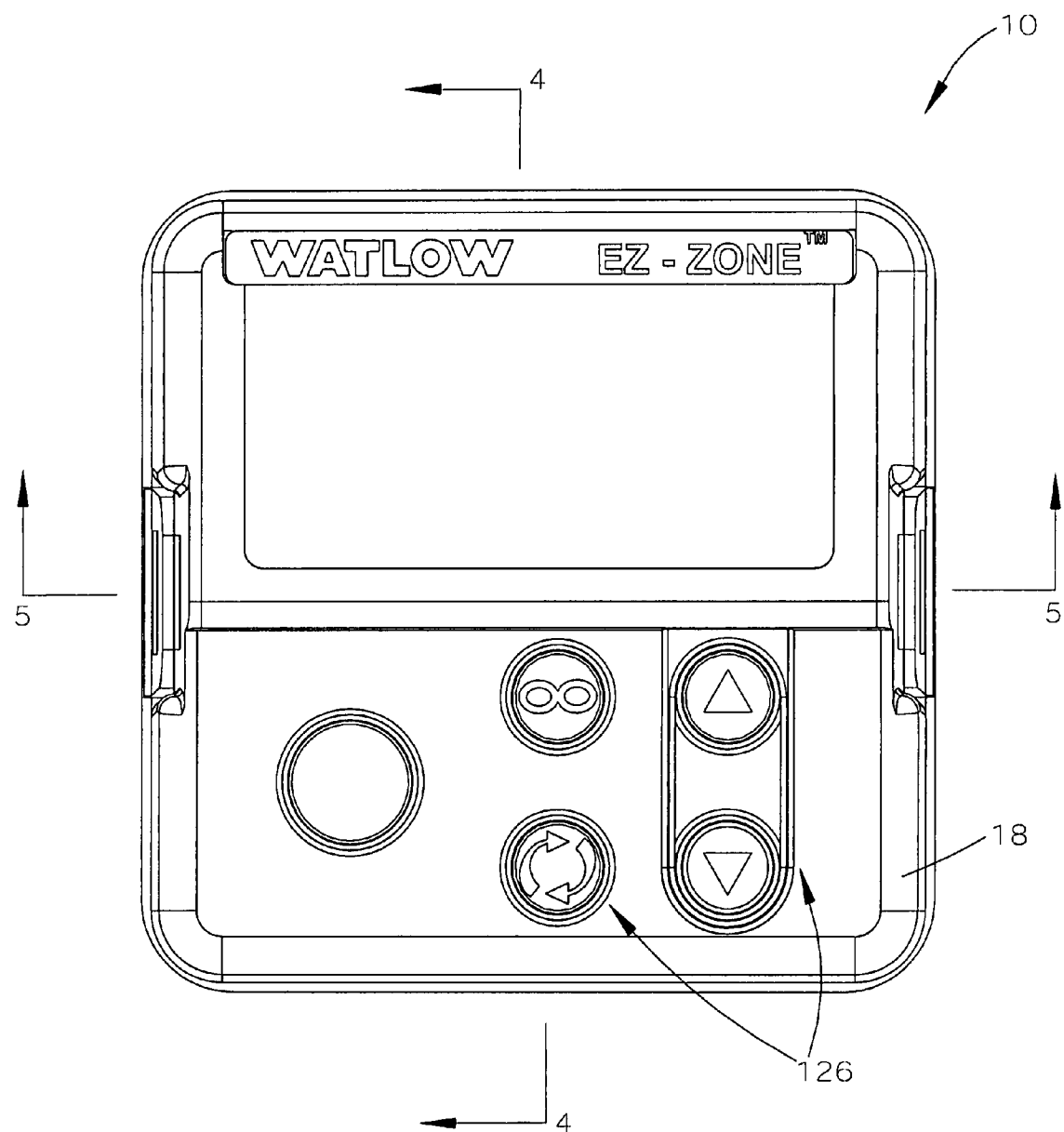
FIG. 3 is a front view of the housing assembly in accordance with the teachings of the present disclosure.
Figure 4:
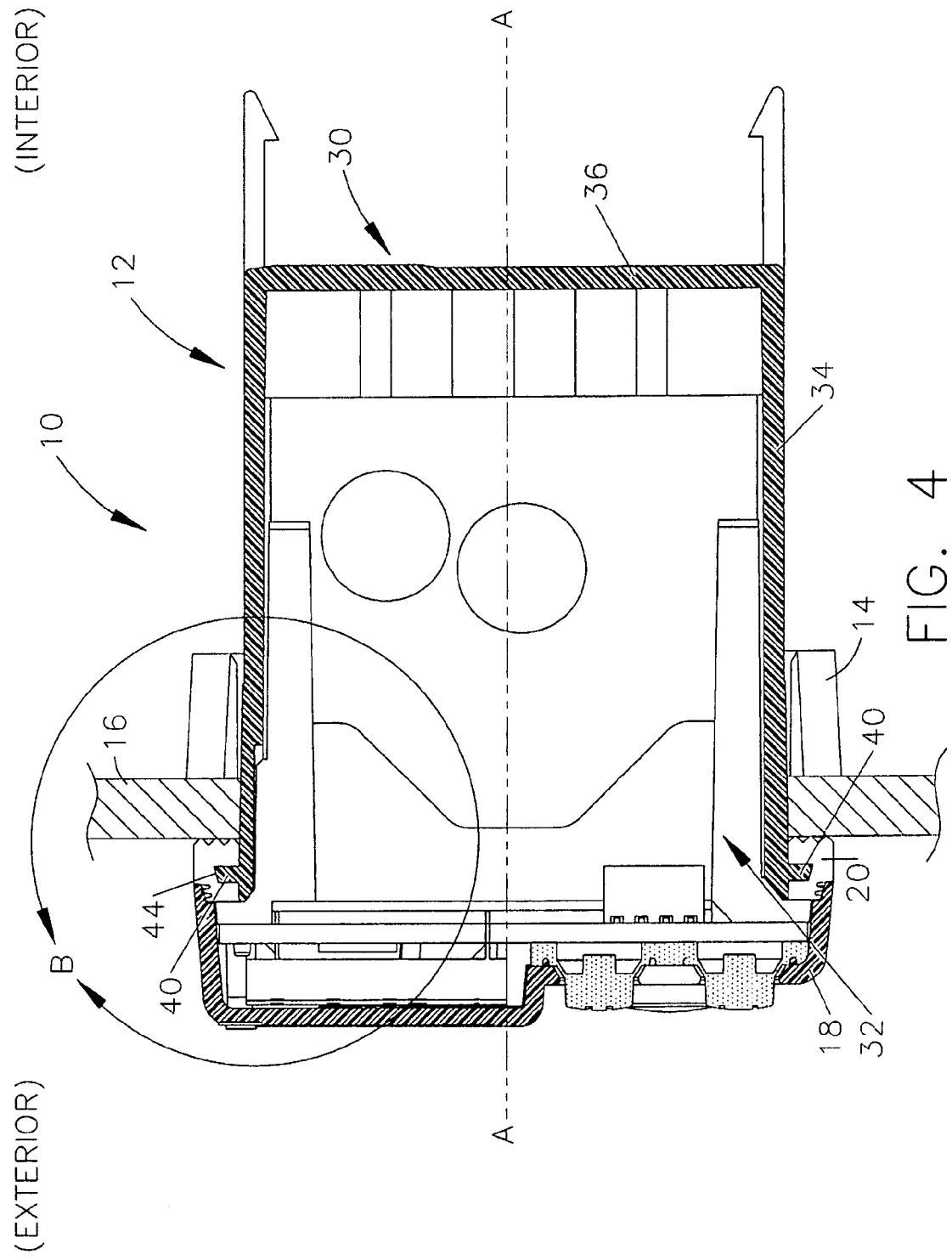
FIG. 4 is a cross-sectional view, taken along line 4-4 of FIG. 3, of the housing assembly mounted to a panel in accordance with the teachings of the present disclosure.
Figure 5:
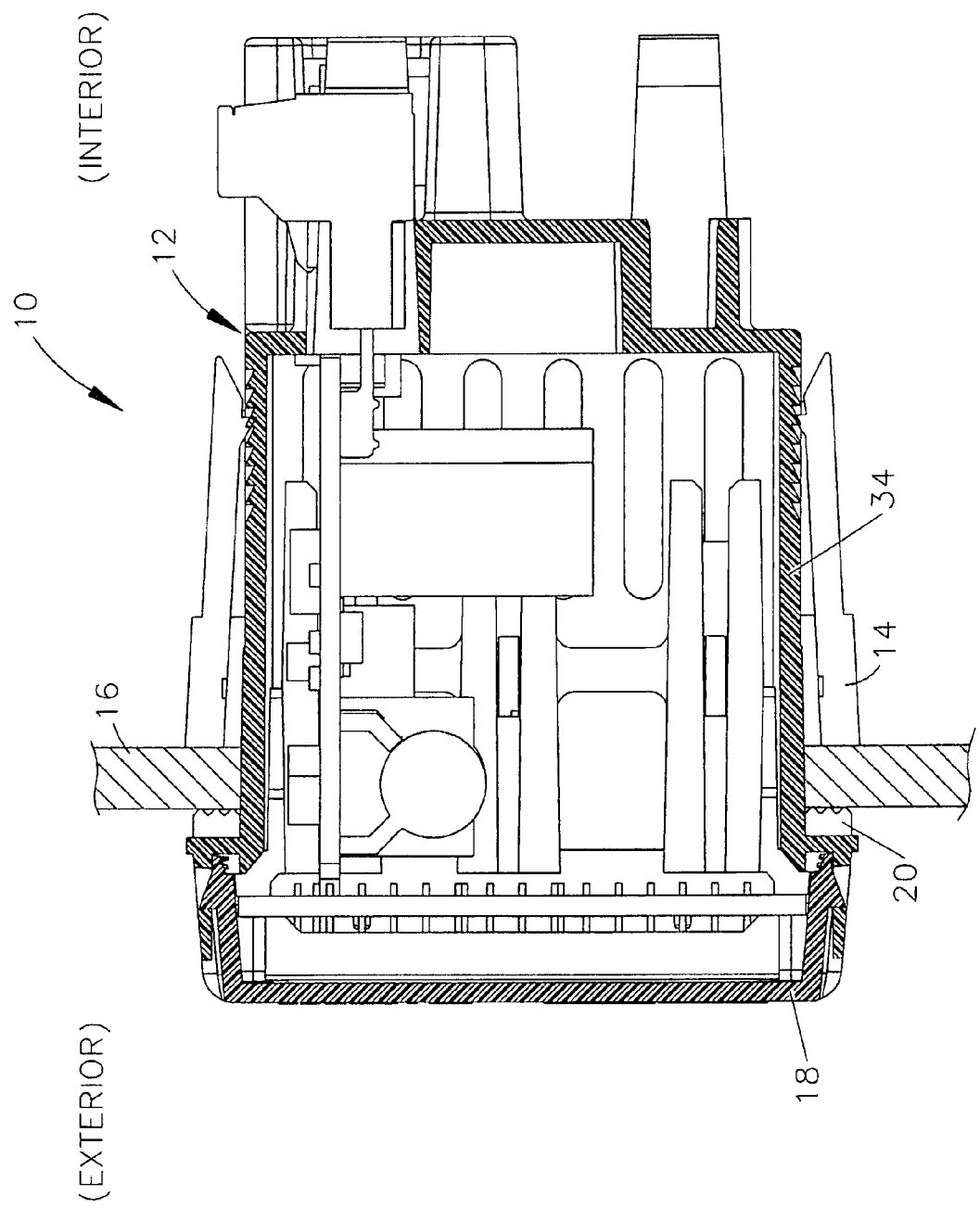
FIG. 5 is a cross-sectional view, taken along line 5-5 of FIG. 3, of the housing assembly mounted to a panel in accordance with the teachings of the present disclosure.

As shown in FIGS. 2 and 4, the case 12 further comprises a flange 40 disposed around the open end 32, which preferably extends substantially perpendicular to the side walls 34. The gasket 20 is preferably secured to the flange 40 as shown such that the flange 40 is embedded within the gasket 20. Additionally, the flange 40 defines an angled top surface 44, the function of which is described in greater detail below.

Referring to FIGS. 1 and 2, the case 12 also includes a pair of locking members 46 disposed proximate the open end 32. The locking members 46 are adapted for engagement of corresponding locking tabs 48 disposed on the cover 18 as shown, the details of which are described in greater detail below. The case 12 also comprises a plurality of sets of grooves 50 disposed along at least one of the side walls 34, which are adapted to receive a corresponding set of clamping arms 52 extending from the mounting collar 14. More specifically, the clamping arms 52 comprise projections 54 that progressively engage and positively latch into the grooves 50 to secure the case 12 to the panel 16, the details of which are described in greater detail below. The engagement and operation of similar clamping arms and grooves are disclosed in U.S. Pat. No. 5,913,439, which is commonly assigned with the present application, and the contents of which are incorporated herein by reference in their entirety.

Figure 6B:
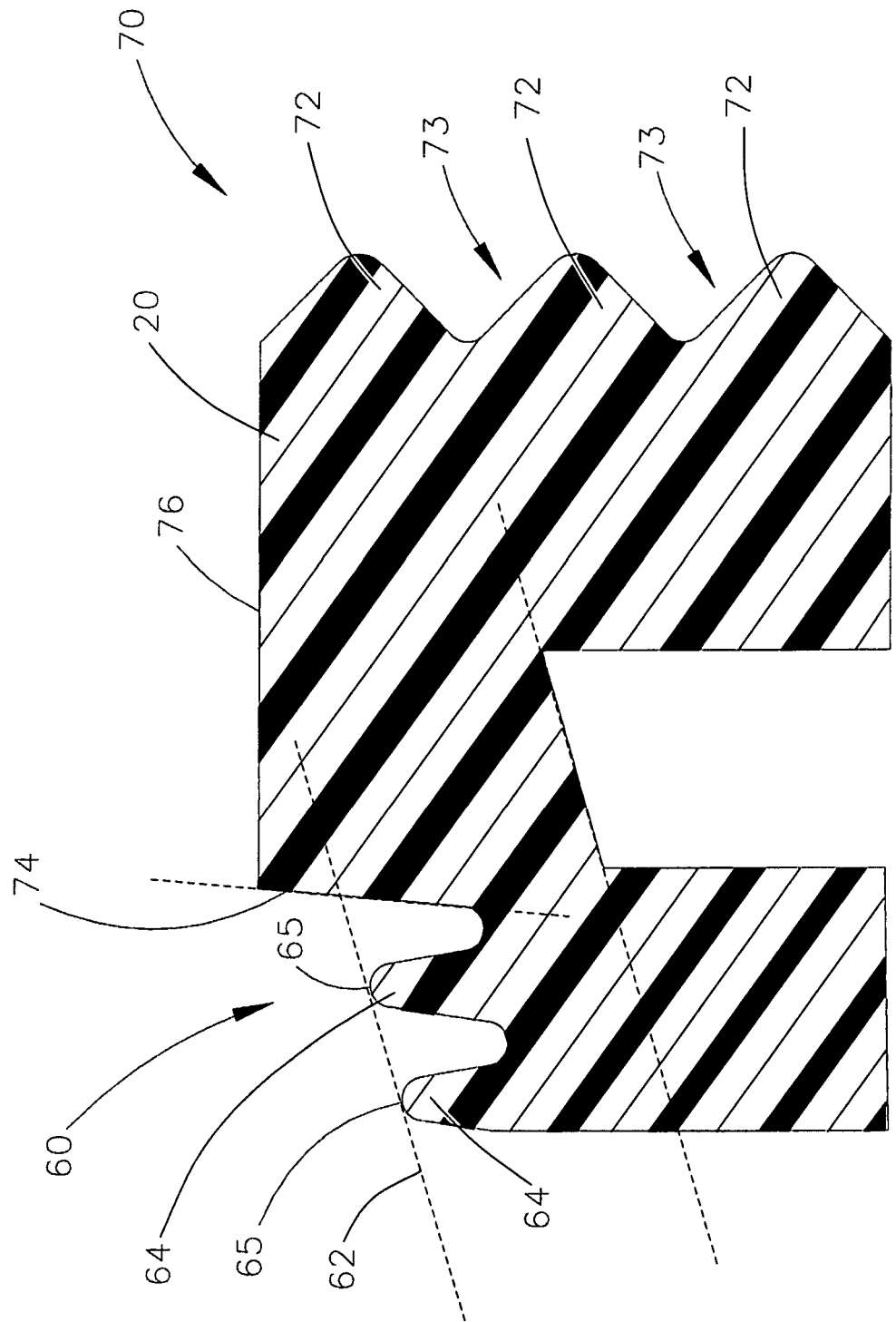
FIG. 6b is an enlarged cross-sectional view of the overall profile of a gasket constructed in accordance with the teachings of the present disclosure.

Referring now to FIGS. 6a and 6b, the gasket 20 comprises a first sealing portion 60 defining an angled profile 62, and a plurality of beads 64 disposed along the angled profile 62. The angled profile 62 is defined by ridges 65 of the beads 64, wherein as illustrated in the exemplary embodiment, a line extends across the tops of the ridges 65 to define the angled profile 62. Therefore, as used herein, the term "angled profile" shall be construed to mean a line, curve, or other spline that is generated by connecting the tops of ridges 65, (or tops of other sealing members having a different geometrical configuration than the exemplary beads 64), and extending along the first sealing portion 60, in the general mounting direction of the cover 18.

The gasket 20 further comprises a second sealing portion 70 opposed to the panel 16 as shown. The second sealing portion 70 defines a plurality of ribs 72, which are separated by a corresponding plurality of grooves 73. Preferably, both the ribs 72 and the beads 64 are continuous and extend around the entire periphery of the gasket 20. However, the ribs 72 and beads 64 may be discontinuous in certain areas in order to accommodate other features of the housing assembly 10 as described in greater detail below.

As further shown, the first sealing portion 60 comprises an angled interior wall 74 extending between one end of the beads 64 and an outer surface 76 of the gasket 20. Preferably, the angled profile 62 defines an acute angle relative to the longitudinal axis A-A (FIG. 4) of the case 12 and the angled interior wall 74 defines an angle greater than the angle of the angled profile 62 relative to the longitudinal axis A-A as shown. Additionally, the angled profile 62 of the first sealing portion 60 is substantially parallel to the top angled surface 44 of the flange 40, so that the portion of the gasket 20 located between the first sealing portion 60 and the top angled surface 44 of the flange 40 is of a relatively uniform thickness.

Generally, when the case 12 is secured to the panel 16, the ribs 72 are compressed against the panel 16 and thus provide a seal between the panel 16 and the case 12. When the cover 18 is secured to the case 12, the beads 64 are compressed against the case and thus provide a seal between the cover 18 and the interior of the case 12. Accordingly, the gasket 20 in accordance with the teachings of the present disclosure provides dual-action sealing since two separate interfaces are sealed with a single sealing member, the gasket 20. The specific details and function of each of the features of the present disclosure are now described in greater detail in the context of installing the housing assembly 10 to the panel 16.

Installation

Referring to FIG. 7, the case 12 with the gasket 20 secured around the open end 32 is first placed within a cutout 80 of the panel 16, and the second sealing portion 70, and more specifically the ribs 72, are placed against an exterior surface 82 of the panel 16. As shown in FIG. 8, the mounting collar 14 is then placed around the case 12 such that the clamping arms 52 are aligned with the grooves 50 in the case 12. The mounting collar 14 is preferably a resilient plastic material such as a thermoplastic so that the clamping arms 52 can be flexed outwardly in the direction of arrows X as shown. Accordingly, the clamping arms 52 are biased inwardly as shown such that a clamping force is maintained when the mounting collar 14 is positively latched into place. The projections 54 are preferably disposed at end portions 84 of the clamping arms 52, and the clamping arms 52 further comprise tapered end portions 86 adjacent the projections 54. The tapered end portions 86 provide access, for either a tool or the fingers of a user, to flex the clamping arms 52 outwardly for removal of the mounting collar 14.

Figure 9:
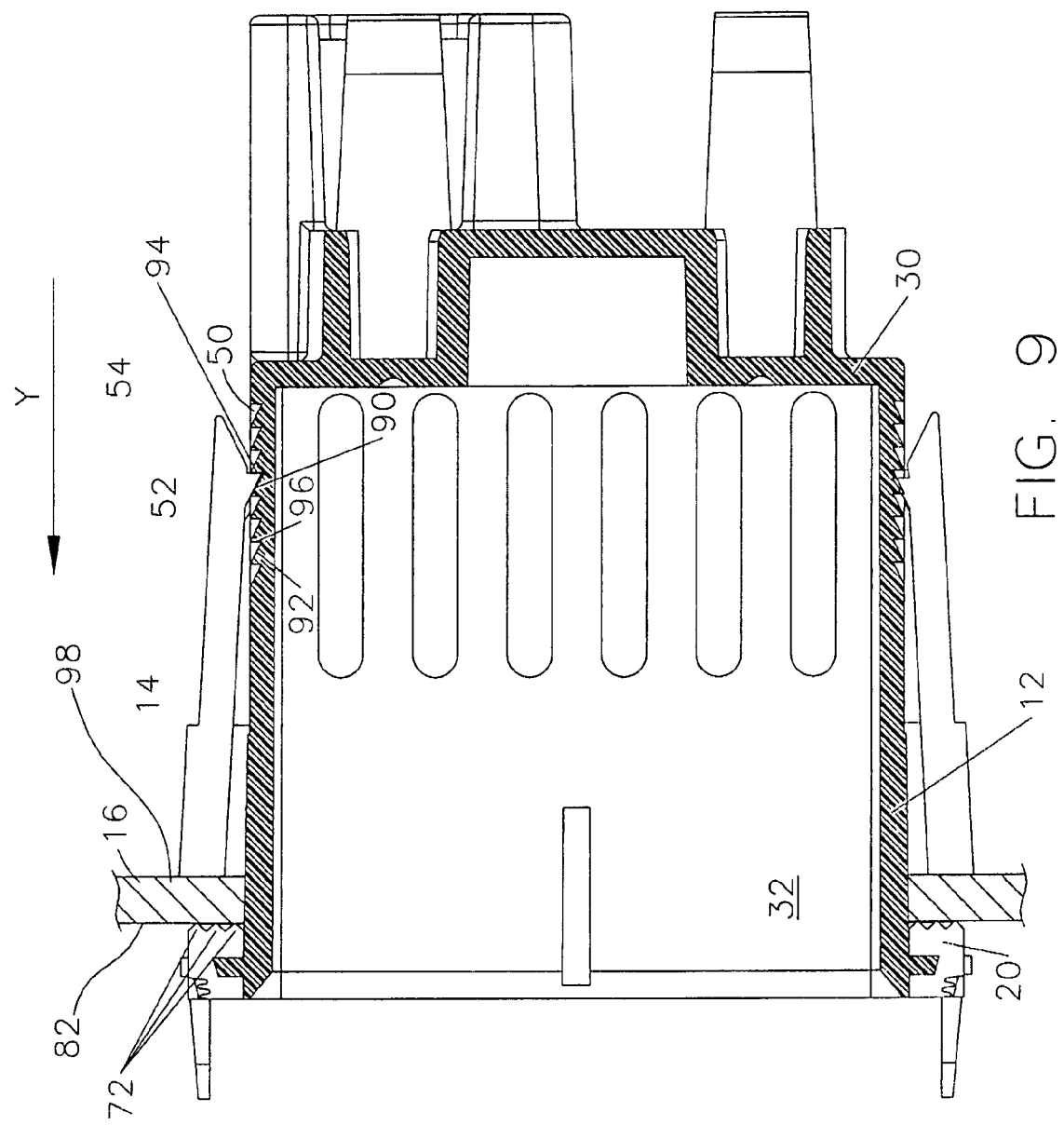
FIG. 9 is a cross-sectional view illustrating the case being secured to the panel by the mounting collar in accordance with the teachings of the present disclosure.

As shown in FIG. 9, as the mounting collar 14 is slid along the outside of the case 12 in the direction of arrow Y, towards the panel 16, the clamping arms 52 flex outwardly and the projections 54 progressively engage the grooves 50 in the case 12. More specifically, both the projections 54 and the grooves 50 define angled surfaces 90 and 92, respectively, and stops 94 and 96, respectively such that the mounting collar 14 positively latches onto the case 12 with its progressive movement towards the panel 16. Accordingly, the term "positively latched" and variations thereof shall be construed to mean that the mounting collar 14 can be freely moved in one direction while movement in an opposite direction is inhibited. With this positive latching configuration, the mounting collar 14 cannot move away from the panel 16 without each of the clamping arms 52 being deflected outwardly such that the projections 54 are completely free from the grooves 50. Accordingly, as the mounting collar 14 engages an interior surface 98 of the panel, the mounting collar 14 is capable of apply progressively higher force as the projections 54 engage successive grooves 50, which translates into progressively more compression of the ribs 72 against the exterior surface of 82 of the panel 16. Therefore, the case 12 can be securely attached to the panel 16, and with adequate compression of the ribs 72, a robust seal is provided between the panel 16 and the case 12. Additionally, with the use of clamping arms 52 and grooves 50, no separate hardware such as multiple mechanical fasteners, and in many instances corresponding washers, are required, thus providing for a much simpler installation and removal of the housing assembly 10.

Advantageously, since a plurality of grooves 50 are disposed along the case 12, a wide range of panel 16 thicknesses can be accommodated. If a thicker panel 16 is used, the projections 54 would lock into the grooves 50 more towards the closed end 30 of the case 12. If a thinner panel 16 is used, the projections 54 would lock into the grooves 50 more towards the open end 32 of the case 12. Accordingly, a variety of panel thickness can easily be accommodated in accordance with the teachings of the present disclosure.

Additionally, the configuration of the second sealing portion 70 in the form of ribs 72 accommodates an exterior surface 82 that is not substantially flat or smooth around the cutout 80. For example, such a non-flat surface may result from any burrs that may be present around the cutout 80 in the case where the cutout 80 is created from the interior portion of the panel 16. Also, any other surface irregularities of the panel 16 proximate the cutout 80, such as warpage, texturing, or other undesirable surface discontinuities, can easily be compensated for by the ribs 72 and corresponding grooves 73.

Figure 10:
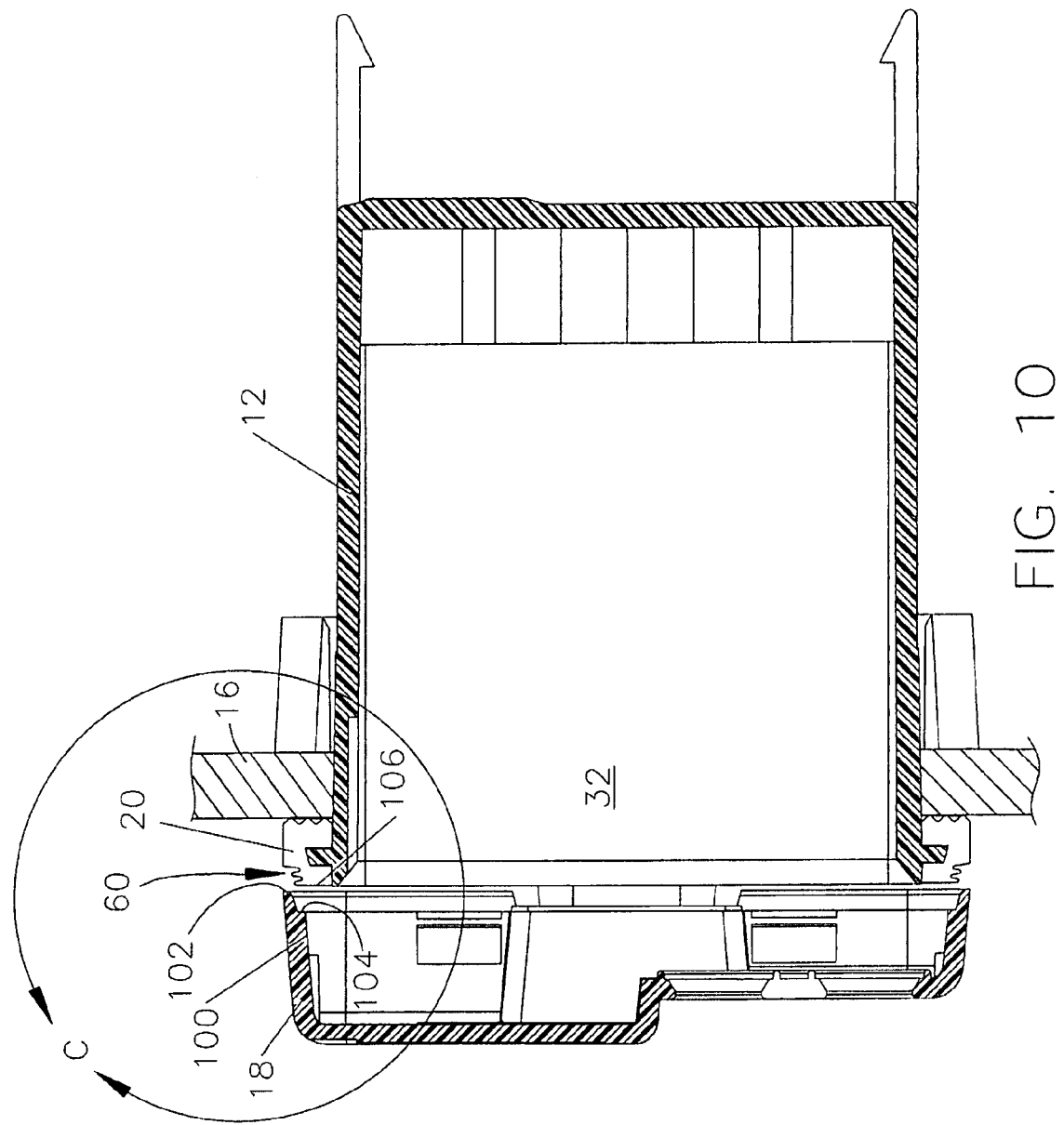
FIG. 10 is a cross-sectional view illustrating a cover positioned for placement onto the case in accordance with the teachings of the present disclosure.
Figure 11:
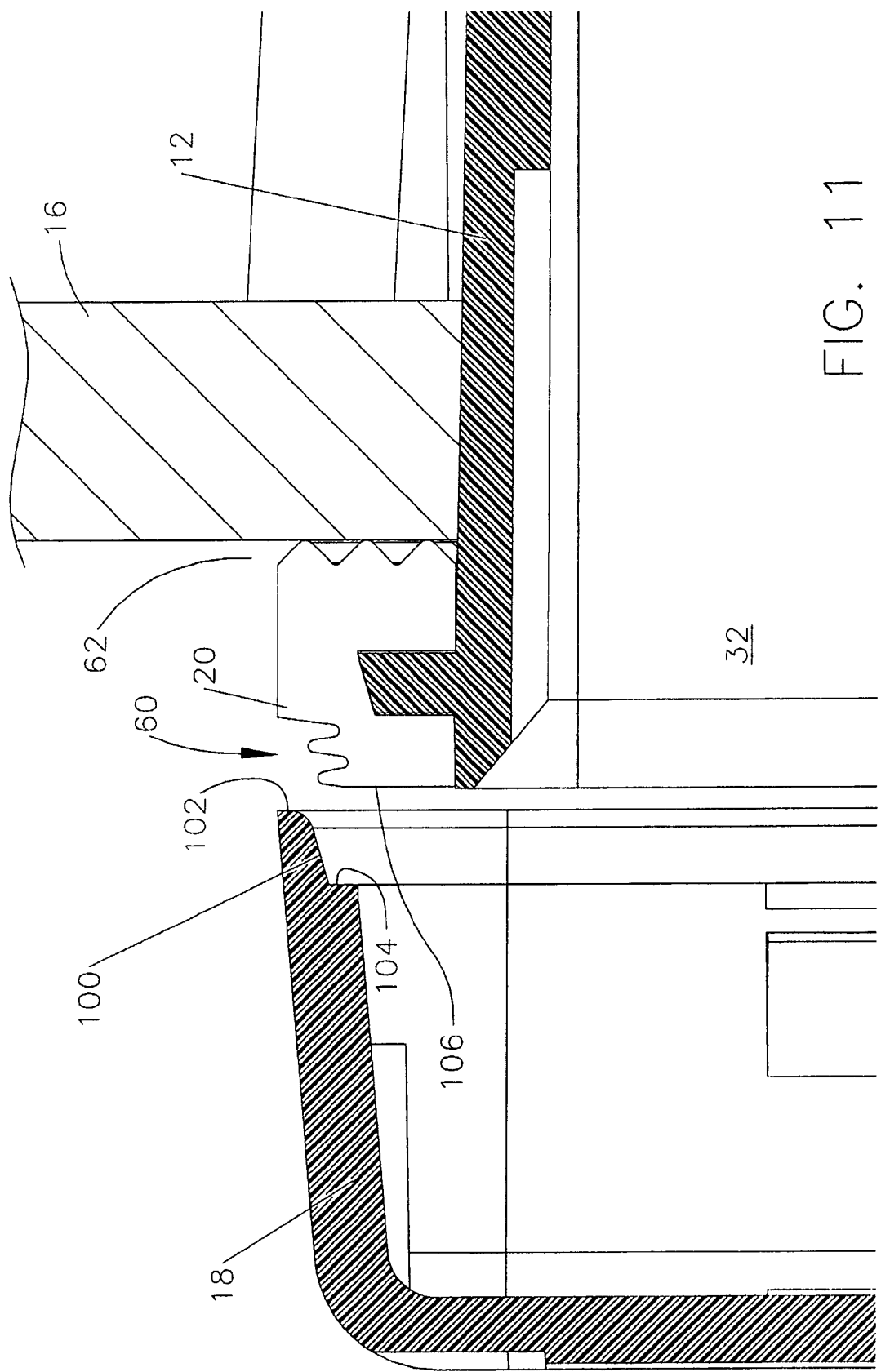
FIG. 11 is an enlarged cross-sectional view, taken from detail C of FIG. 10, illustrating the cover positioned for placement onto the case in accordance with the teachings of the present disclosure.

Referring to FIGS. 10 and 11, once the case 12 is secured to the panel 16, the cover 18 is placed proximate the open end 32 of the case 12 for installation. As shown, the cover 18 comprises an angled periphery surface 100 and an end surface 102 adapted for engagement with the first sealing portion 60 of the gasket 20. Preferably, the angled periphery surface 100 defines an angle that is substantially parallel to the angle of the angled profile 62. Additionally, the cover 18 comprises an interior wall 104 that is positioned adjacent an exterior wall 106 of the gasket 20.

Figure 12:
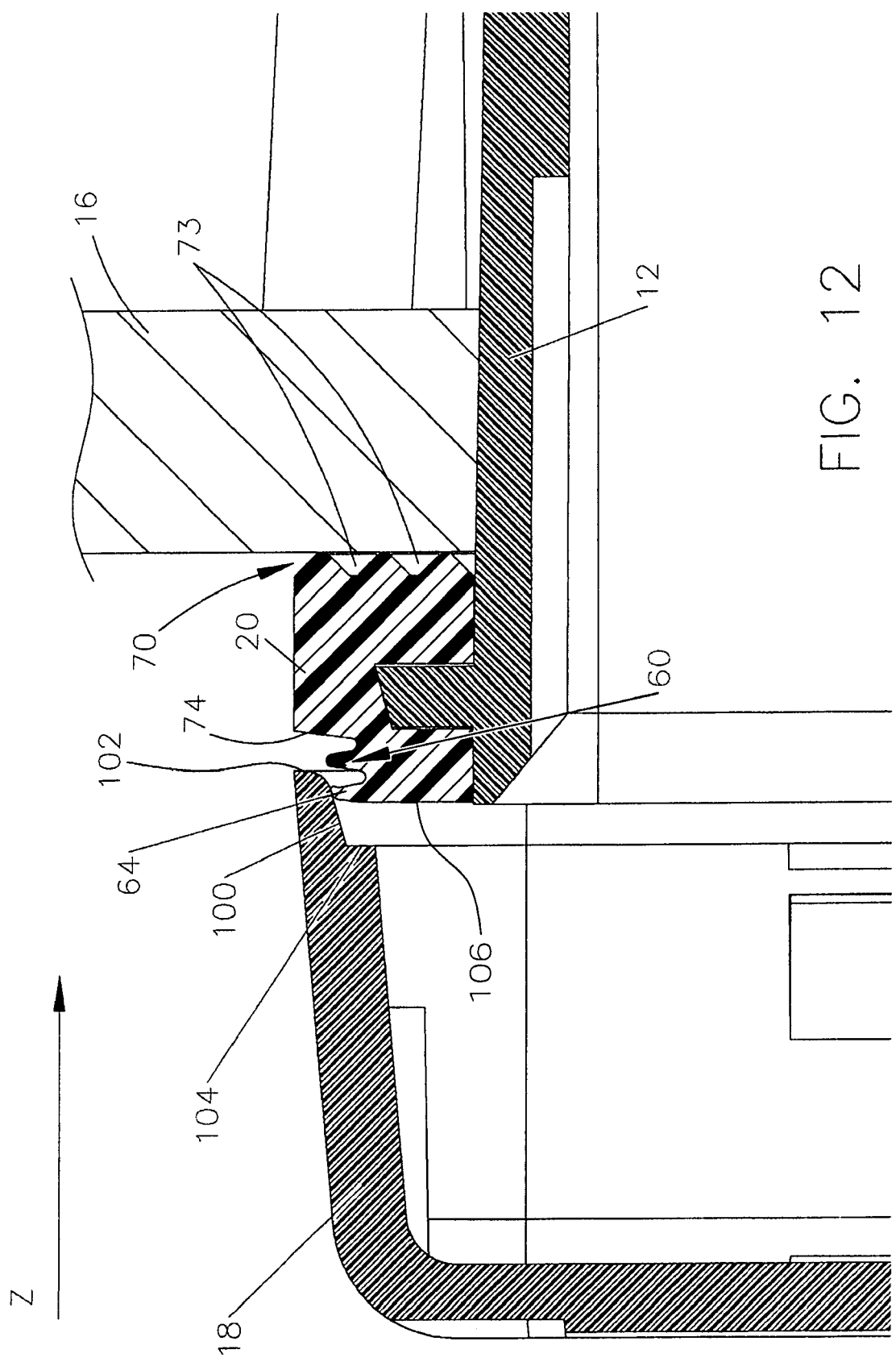
FIG. 12 is an enlarged cross-sectional view, taken from detail C of FIG. 10, illustrating the cover engaging the gasket in accordance with the teachings of the present disclosure.
Figure 13:
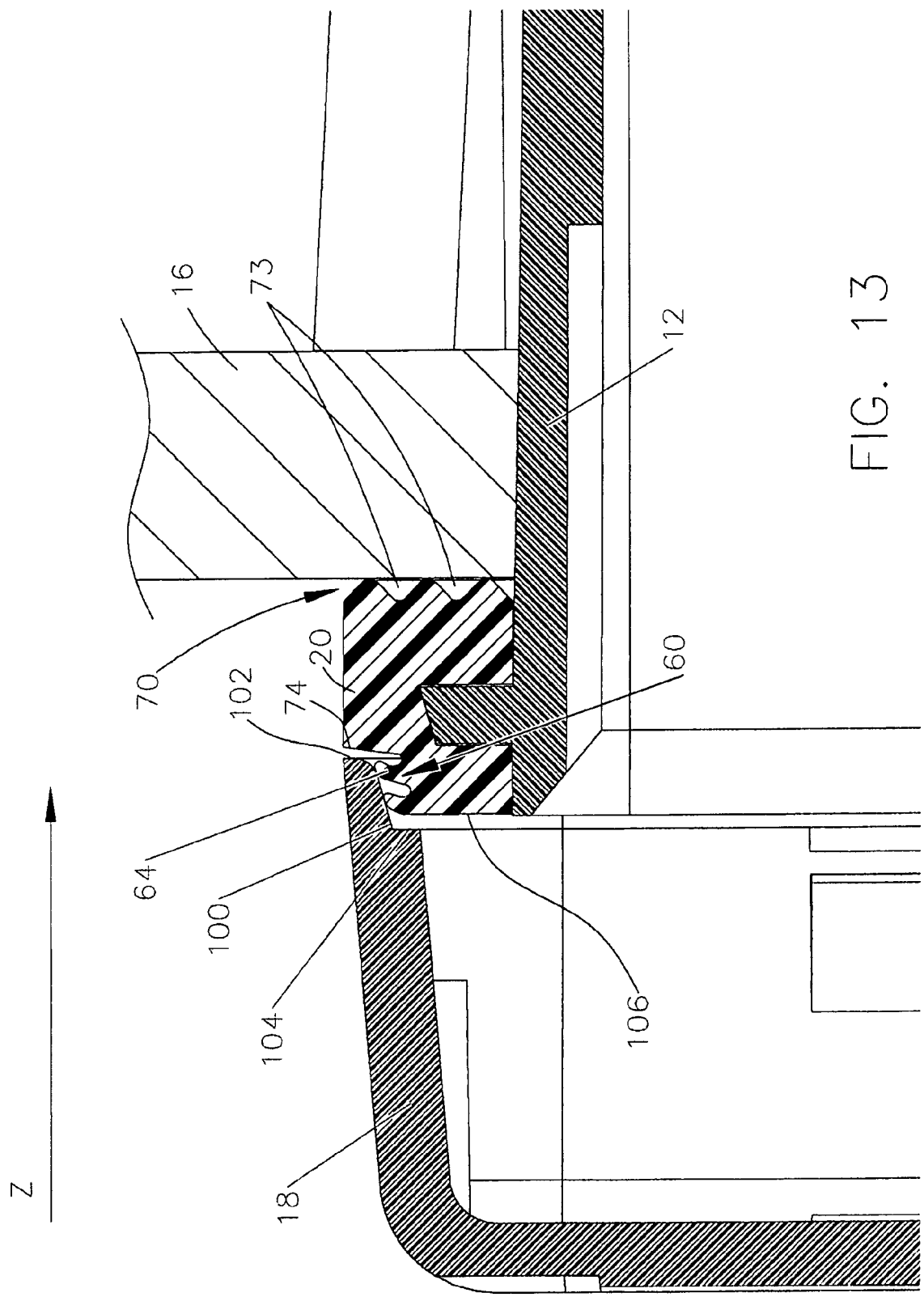
FIG. 13 is an enlarged cross-sectional view, taken from detail C of FIG. 10, illustrating the cover further engaging the gasket in accordance with the teachings of the present disclosure.
Figure 14:
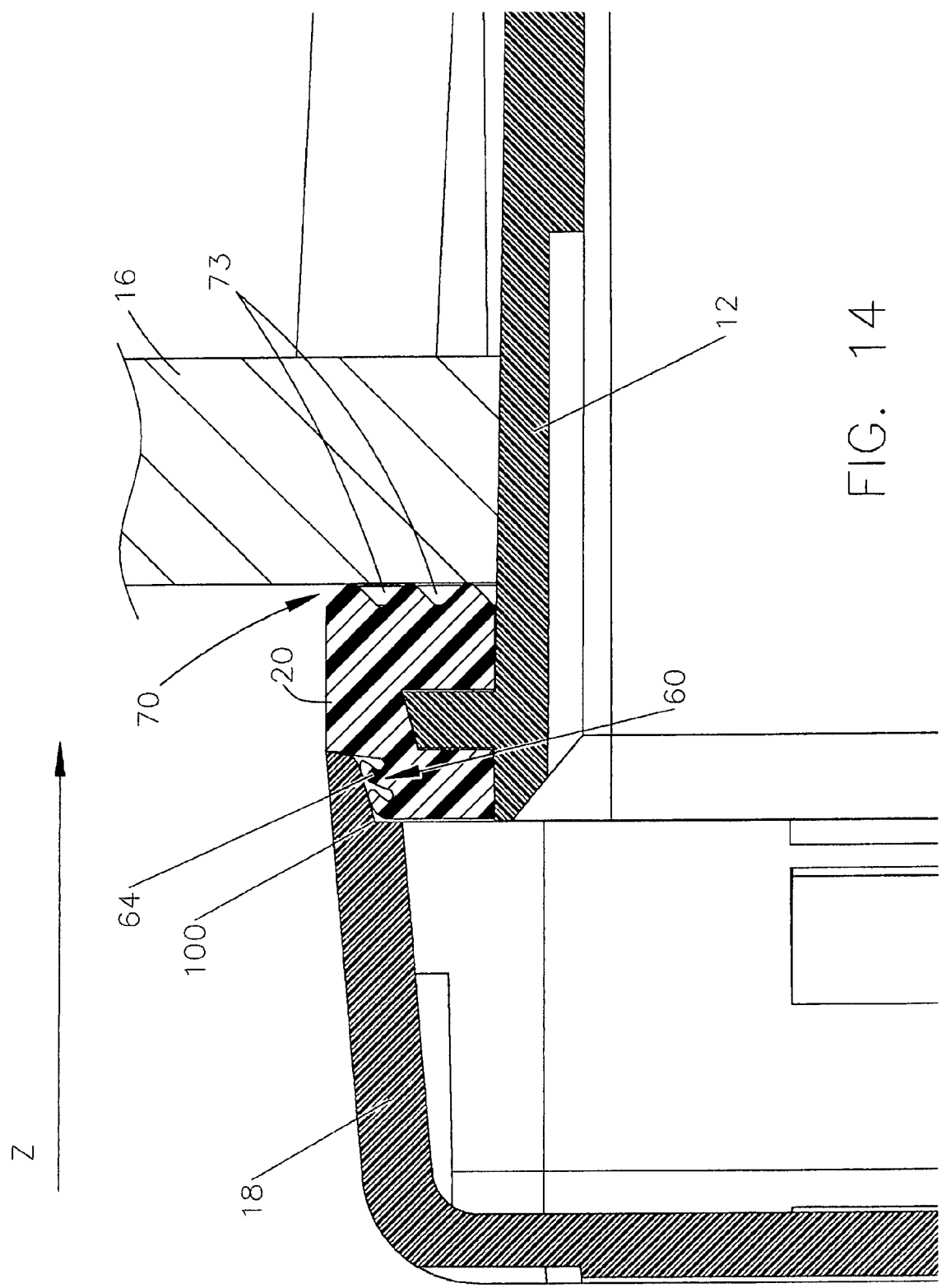
FIG. 14 is an enlarged cross-sectional view, taken from detail C of FIG. 10, illustrating the cover fully engaged with the gasket in accordance with the teachings of the present disclosure.
Figure 15:
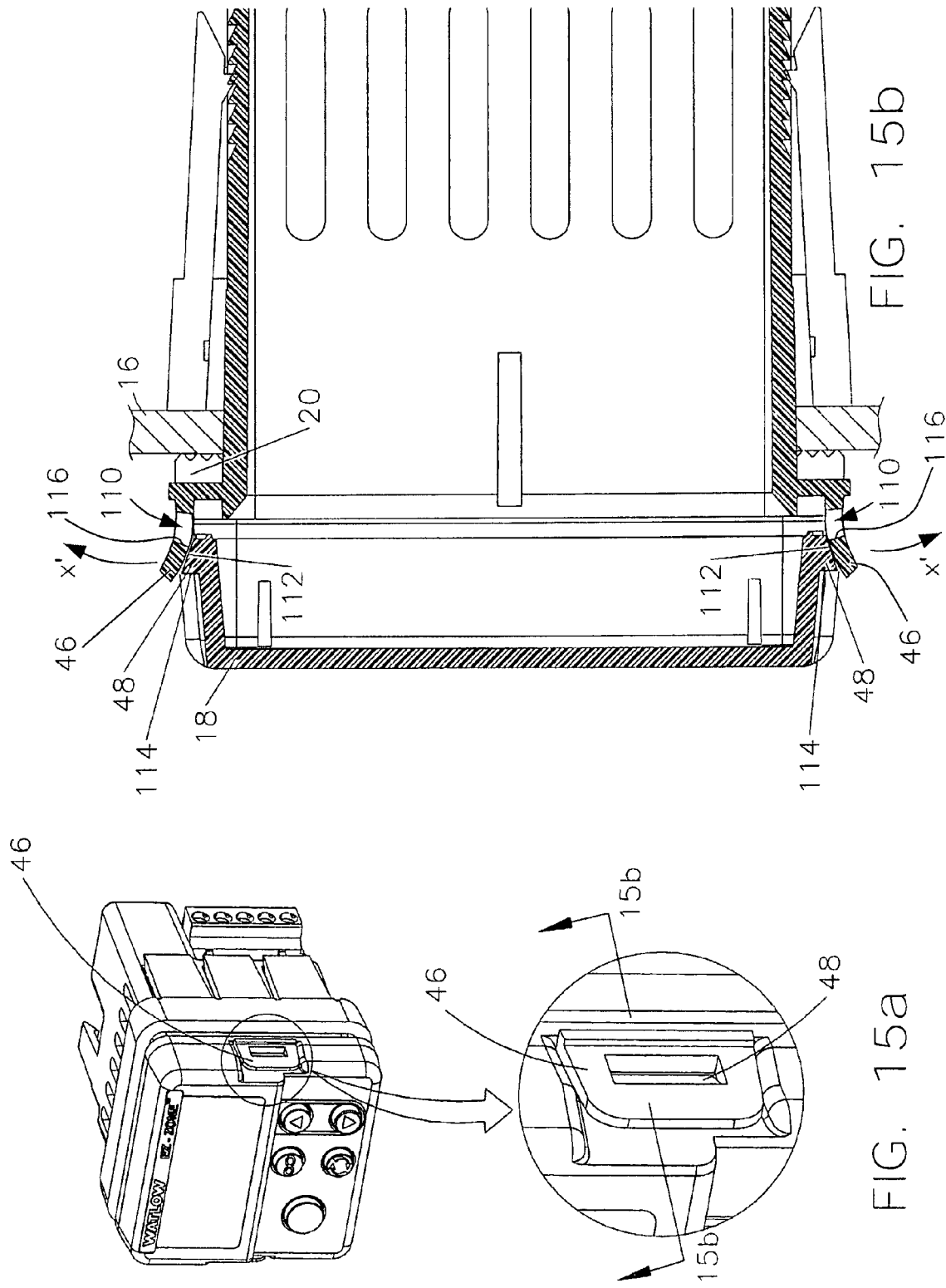
FIG. 15a is an enlarged perspective detail view of locking members of the case engaging locking tabs of the cover and constructed in accordance with the teachings of the present disclosure.
FIG. 15b is a cross sectional view, taken along line 15b-15b of FIG. 15a, illustrating locking members of the case deflected outwardly for engagement of the locking tabs of the cover in accordance with the teachings of the present disclosure.
Figure 16:
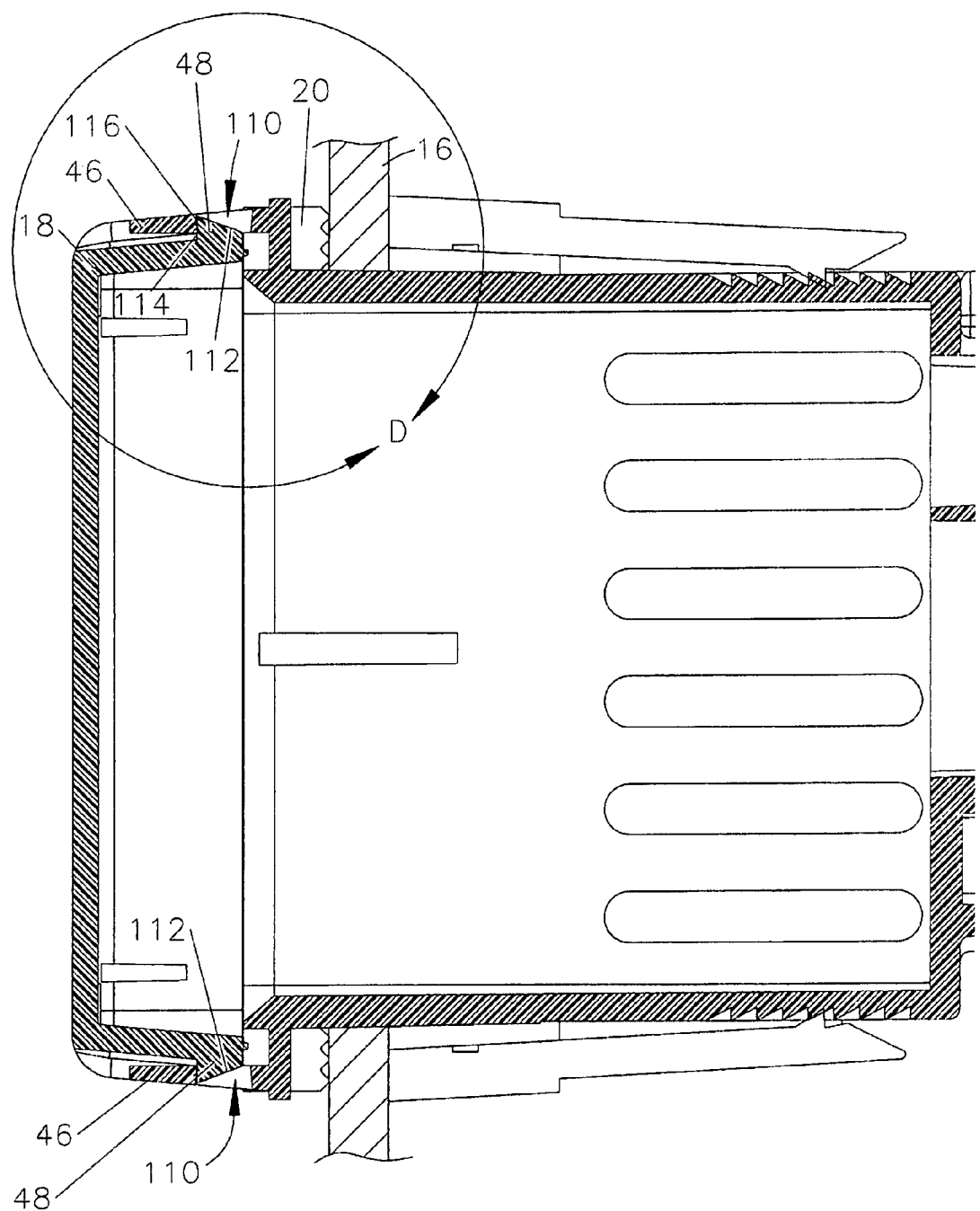
FIG. 16 is a cross sectional view illustrating the locking members fully engaged with the locking tabs in accordance with the teachings of the present disclosure.
Figure 17:
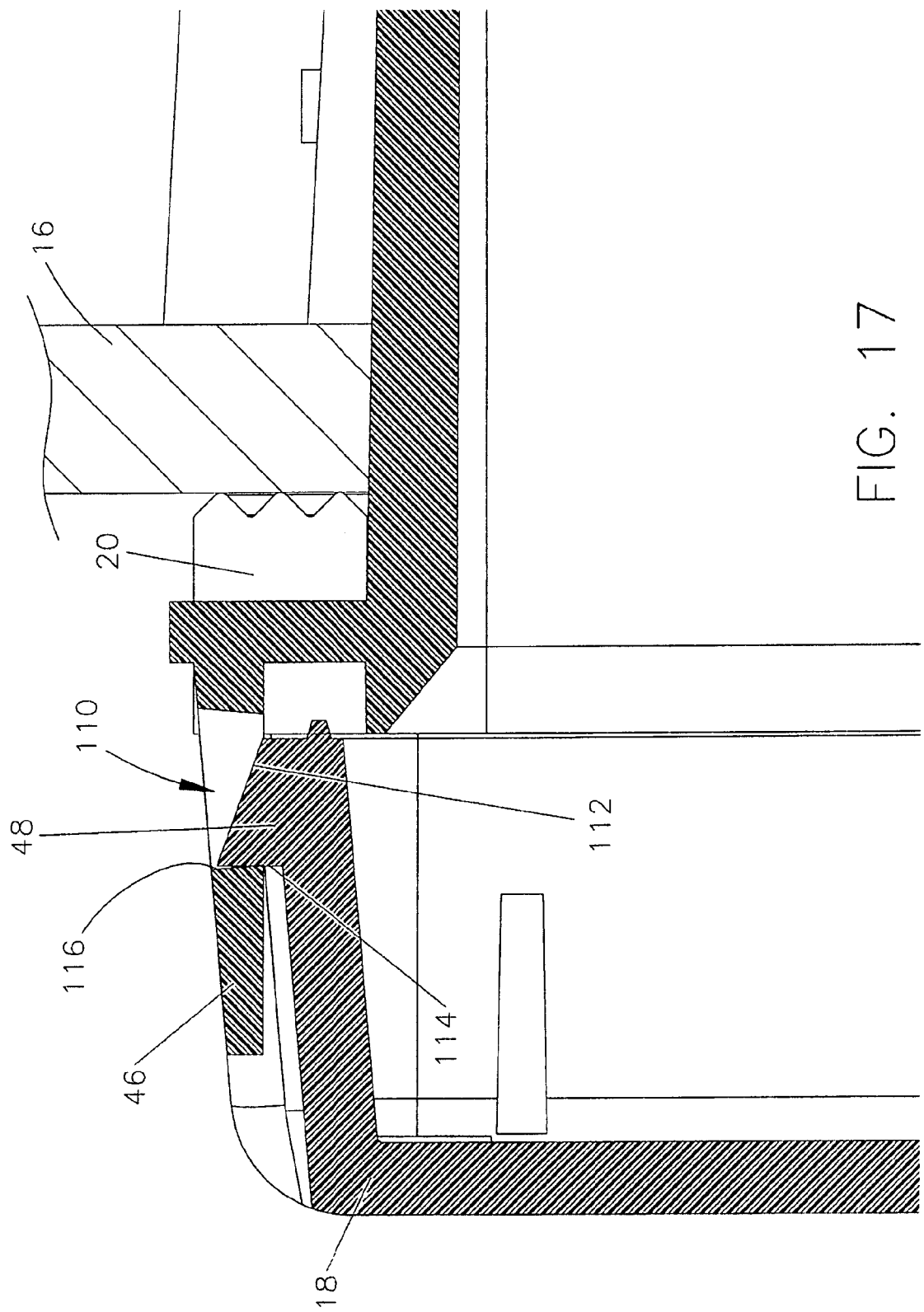
FIG. 17 is an enlarged cross sectional view, taken from detail D of FIG. 16, illustrating the locking members fully engaged with the locking tabs in accordance with the teachings of the present disclosure.

Referring now to FIGS. 12 through 14, as the cover 18 is progressively slid onto the gasket 20, the beads 64 elastically deform as shown as they are engaged by the angled periphery surface 100 of the cover 18, thus provide a seal between the cover 18 and the case 12. As the cover 18 is moved in the direction of arrow Z, towards the panel 16 in a general mounting direction, the beads 64 deform more and thus the contact area between the beads 64 and the angled periphery surface 100 increases. Also, the end surface 102 of the cover 18 engages the angled interior wall 74 of the gasket 20 as shown. In the final mated position as shown in FIG. 14, the angled profile 62 is opposed to the angled periphery surface 100 and provides a robust seal between the outside environment and the case 12.

As such, the interface between the cover 18 and the gasket 20 is sealed from outside moisture. If any outside moisture attempts to flow into this interface, the hydraulic force of the moisture forces the beads 64 against the angled periphery surface 100, thereby further improving the sealing effect along the first sealing portion 60. As any outside moisture attempts to flow into the interface between the second sealing portion 70 and the panel 16, the moisture has a tendency to become trapped within the grooves 73, thus further reducing the possibility of moisture from entering the case 12. Additionally, the shape of the beads 64 and their relatively small cross-sectional area contributes to a lower insertion force to properly secure the cover 18 to the case 12. This lower insertion force contributes to reduced stresses on the locking members 46, which are described in greater detail below. The present disclosure also allows for a broader selection of materials for the gasket, such that materials having a higher durometer (as described in greater detail below), which generally require a much higher insertion force, can be employed due to the lower insertion force that results from the design of the beads 64.

Due to its unique dual action sealing capability, the gasket 20 has advantages over a typical o-ring or other planar sealing members. More specifically, the gasket 20 provides the first sealing portion 60 against the cover 18 and the second sealing portion 70 against the panel 16. Instead of two sealing members as conventionally required, a single gasket 20 can achieve the sealing between the case 12 and the cover 18, and also between the case 12 and the panel 16. Moreover, the provision of the plurality beads 64 and the angled interior wall 74 enables a relatively low mounting force to achieve an effective seal. The unique construction of the gasket 20 further improves sealing between the cover 18 and the gasket 20 when a hydraulic force is applied to the gasket 20 due to the unique orientation and configuration of the beads 64.

After the cover 18 is properly installed onto the gasket 20, the cover is locked into place with the locking members 46 as previously described. As shown in FIGS. 15a through 17, the locking members 46 comprise cutouts 110 that are engaged by the locking tabs 48 to secure the cover 18 to the case 12. Accordingly, the locking members 46 are preferably a resilient plastic material such that the locking members 46 can be flexed outwardly in the direction of arrows X' as shown. Since the locking tabs 48 define angled surfaces 112, the cover 18 can be snapped into place as the angled surfaces 112 force the locking members 46 outwardly until the locking tabs 48 are positioned within the cutouts 110. In this position, a shoulder 114 disposed along the locking tabs 48 engages an interior surface 116 of a cutout 110 to lock the cover 18 into place. For removal of the cover 18, the locking tabs 48 are flexed outwardly until the locking tabs 48 are free from the cutouts 110, and the cover 18 is then pulled away from the gasket 20. Accordingly, the cover 18 also include a positive latching configuration in accordance with the teachings of the present disclosure.

Figure 18:
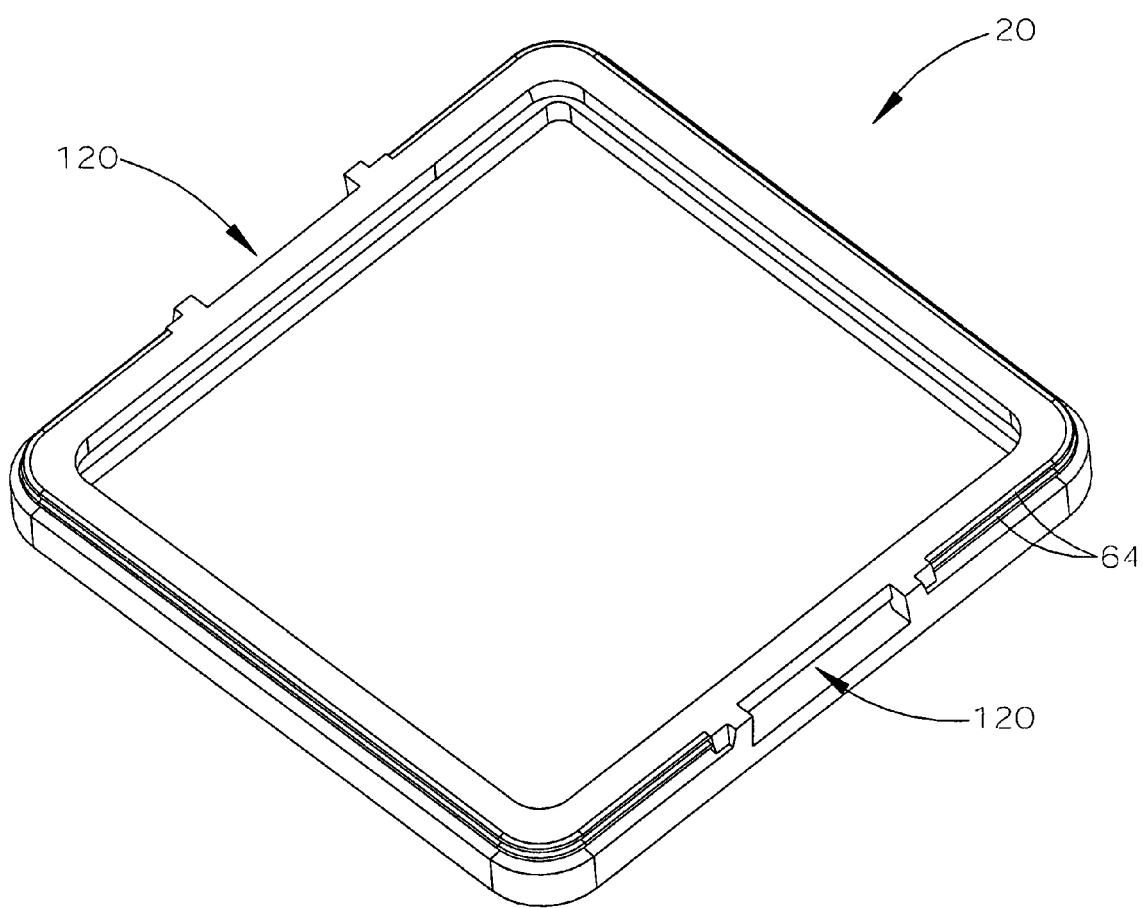
FIG. 18 is a perspective view of a gasket constructed in accordance with the teachings of the present disclosure.
Figure 19:
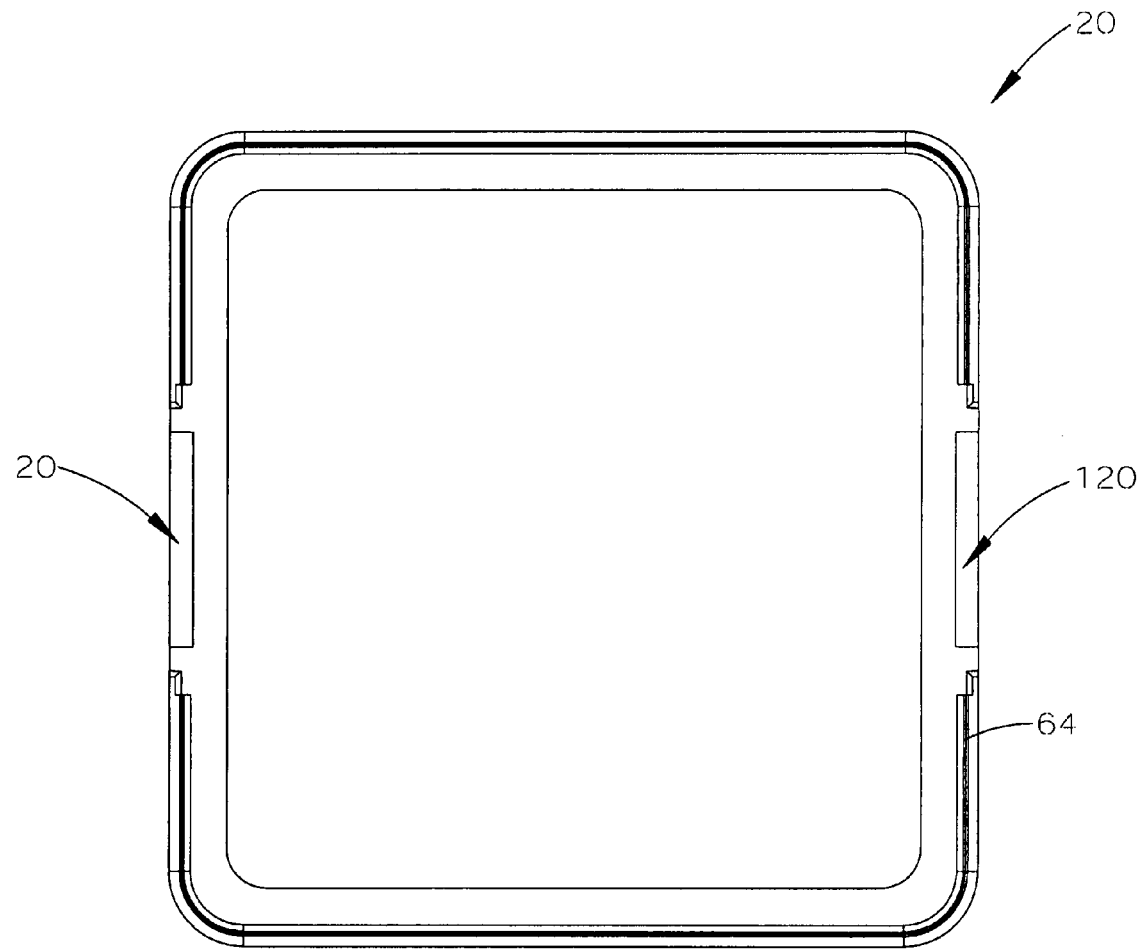
FIG. 19 is a top view of the gasket in accordance with the teachings of the present disclosure.
Figure 20:
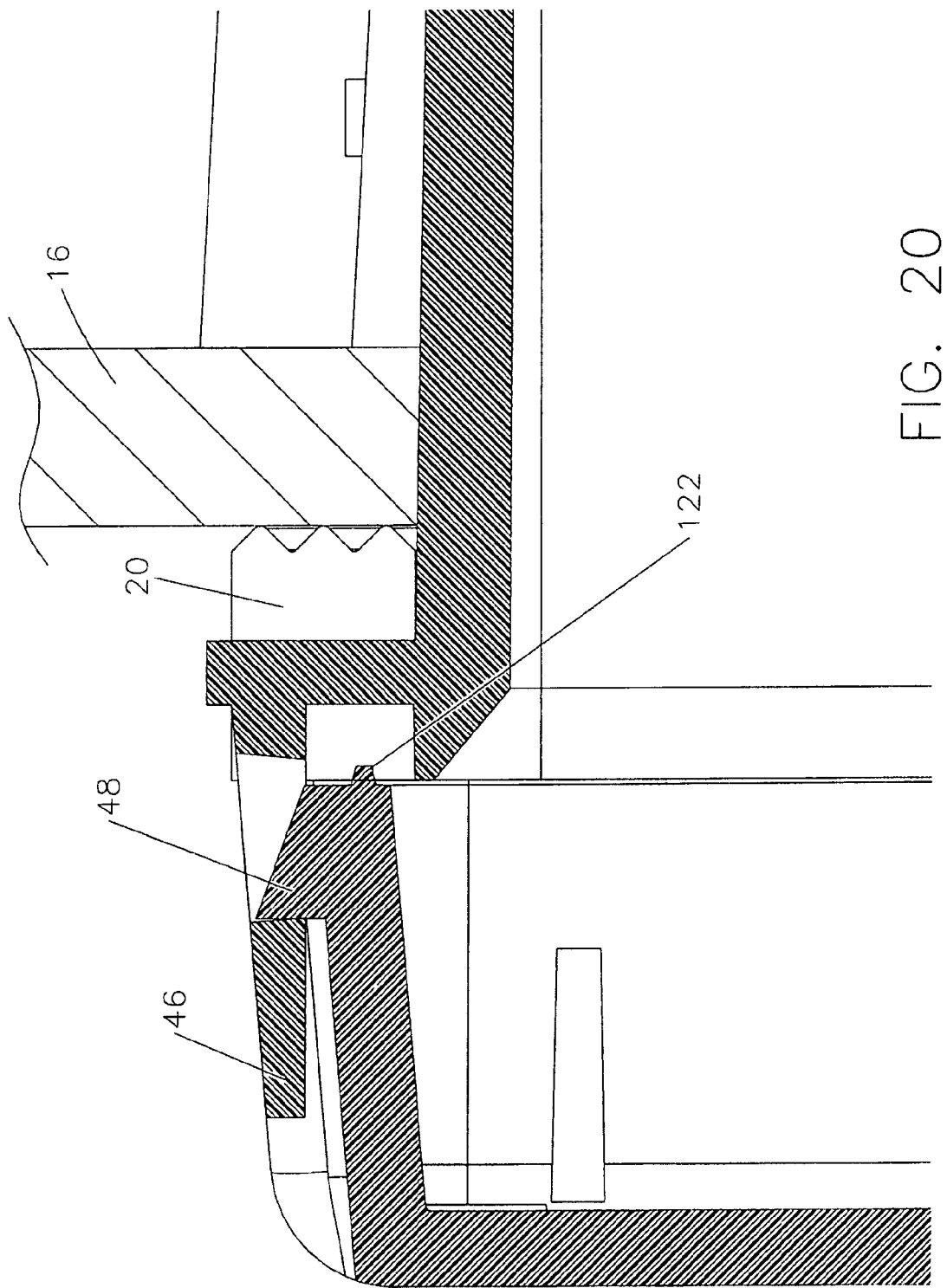
FIG. 20 is an enlarged cross-sectional view of a locking member proximate a recessed portion of the gasket in accordance with the teachings of the present disclosure.

Referring now to FIGS. 18 through 20, the gasket 20 further comprises recessed portions 120 to accommodate the locking members 46. In one form of the present disclosure, the beads 64 do not extend along the recessed portions 120 as shown, in order to reduce the amount of force required to fully engage the locking tabs 48 within the locking members 46. Accordingly, the cover 18 comprises ridges 122 (FIG. 20) disposed along an end portion of the locking tabs 48 to engage the gasket 20 and provide for an improved seal.

Figure 21:
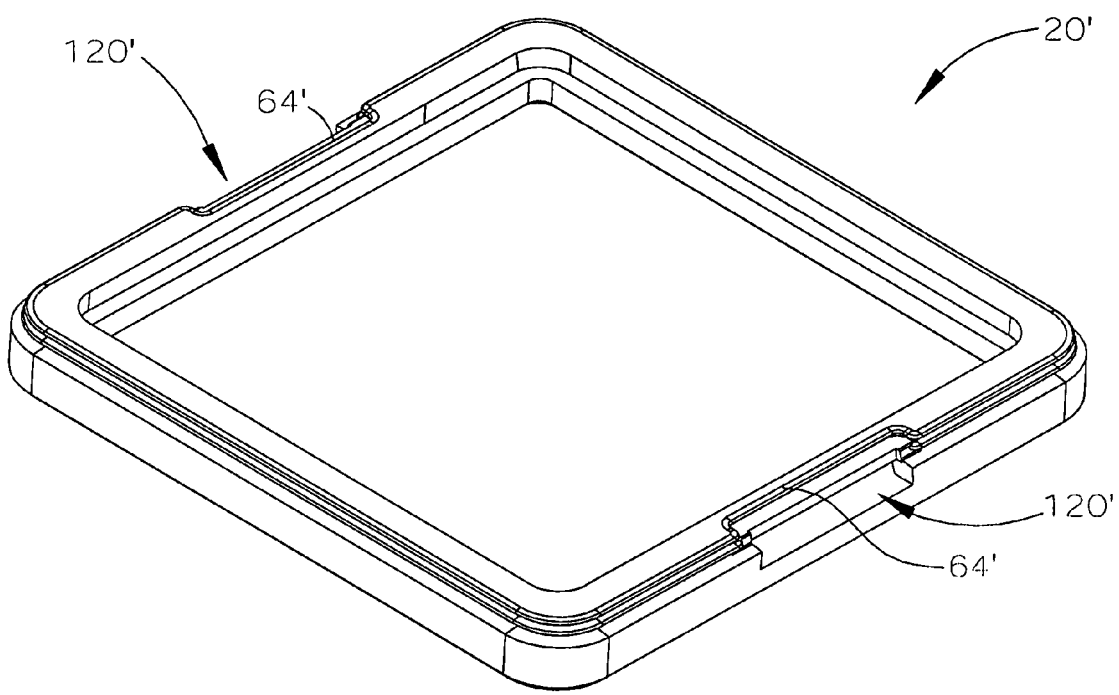
FIG. 21 is a perspective view of a second embodiment of a gasket constructed in accordance with the teachings of the present disclosure.
Figure 22:
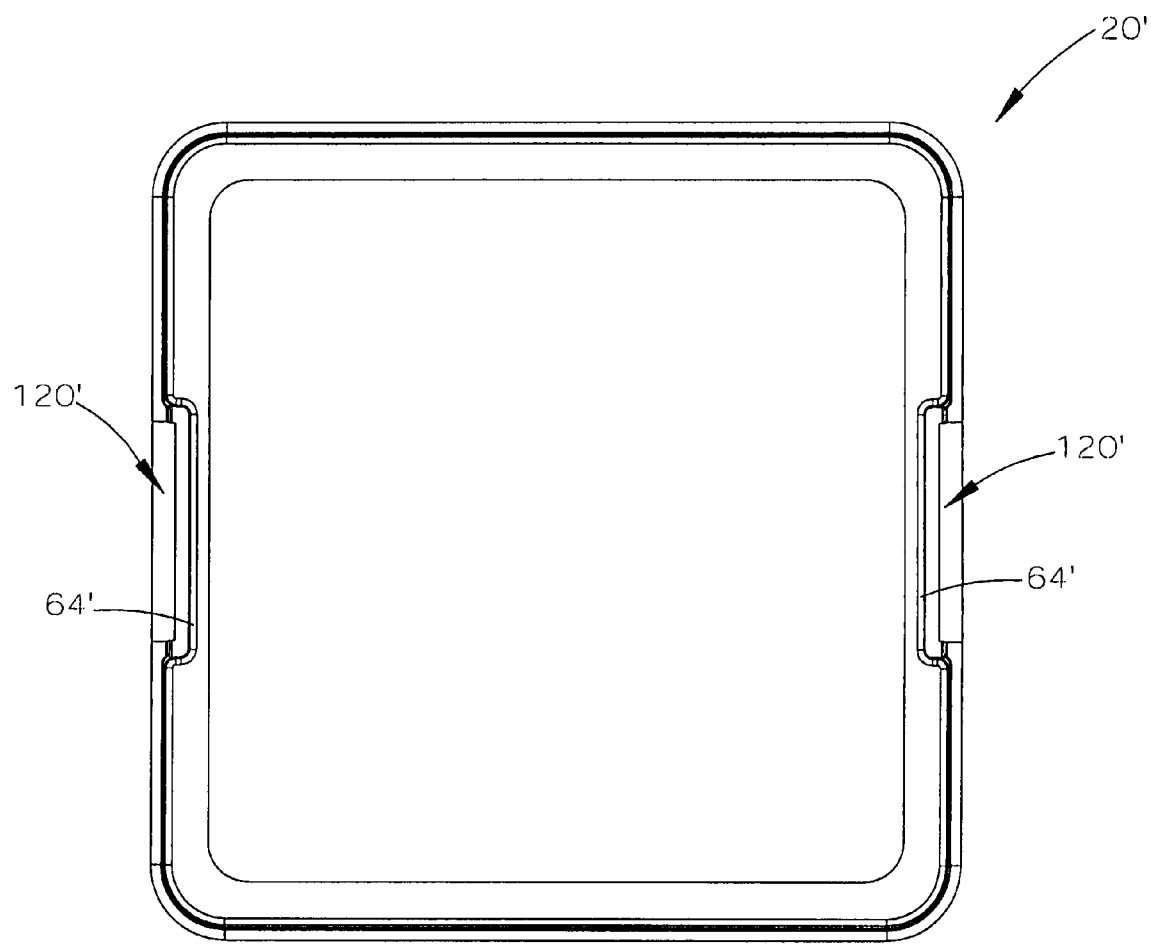
FIG. 22 is a top view of the second gasket in accordance with the teachings of the present disclosure.
Figure 23:
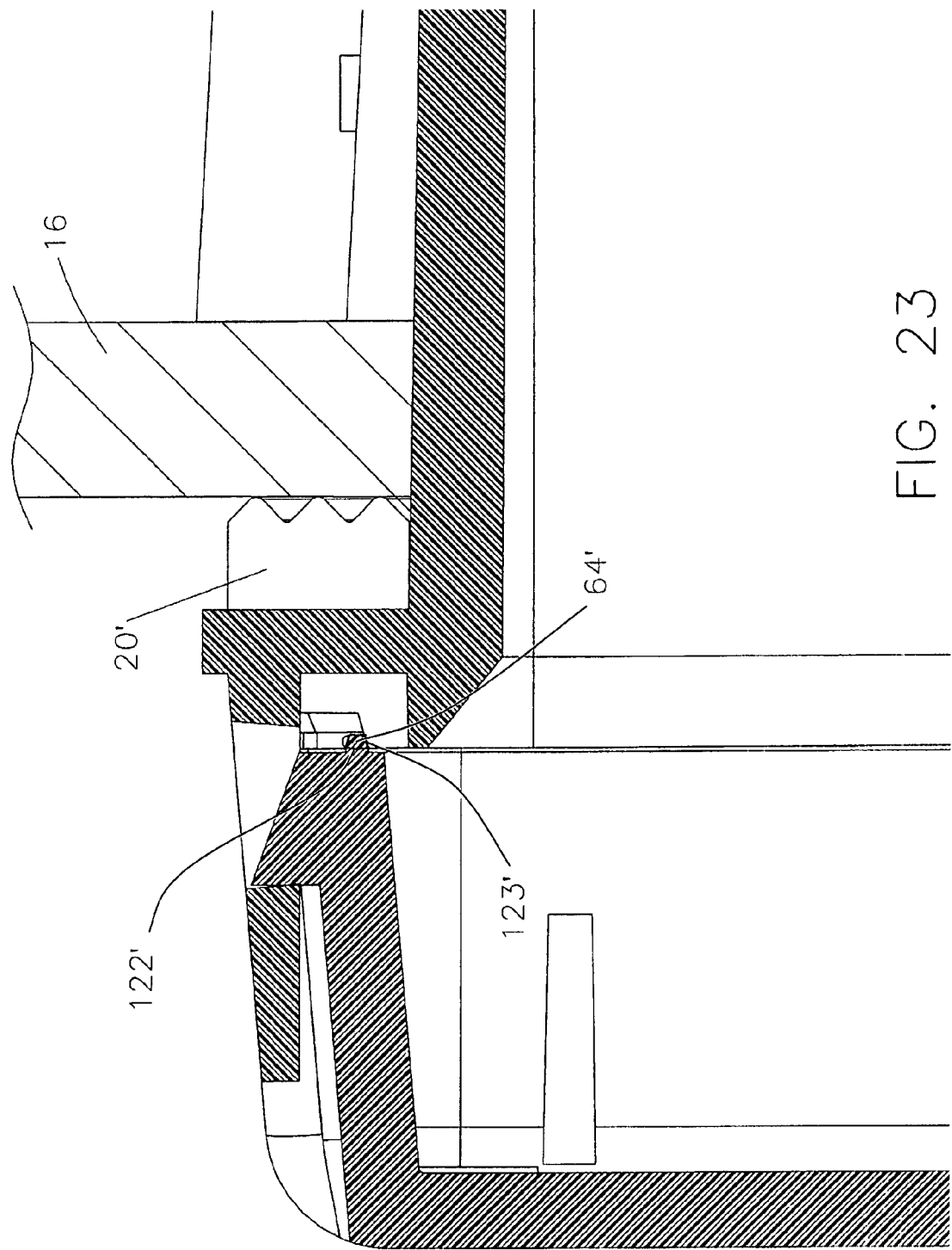
FIG. 23 is an enlarged cross-sectional view of a locking member proximate a recessed portion of the second gasket in accordance with the teachings of the present disclosure.

Alternately, as shown in FIGS. 21 through 23, the gasket 20' includes only one of the beads 64' extending along the recessed portions 120'. With one bead 64', the amount of force required to fully engage the locking tabs 48 is still reduced while maintaining an improved seal between the locking members 46 and the case 12. Additionally, the ridge 122' engages the bead 64', and as such defines an angled surface 123, similar to the angled periphery surface 100 of the cover 18, to provide a robust seal as previously described.

Figure 24:
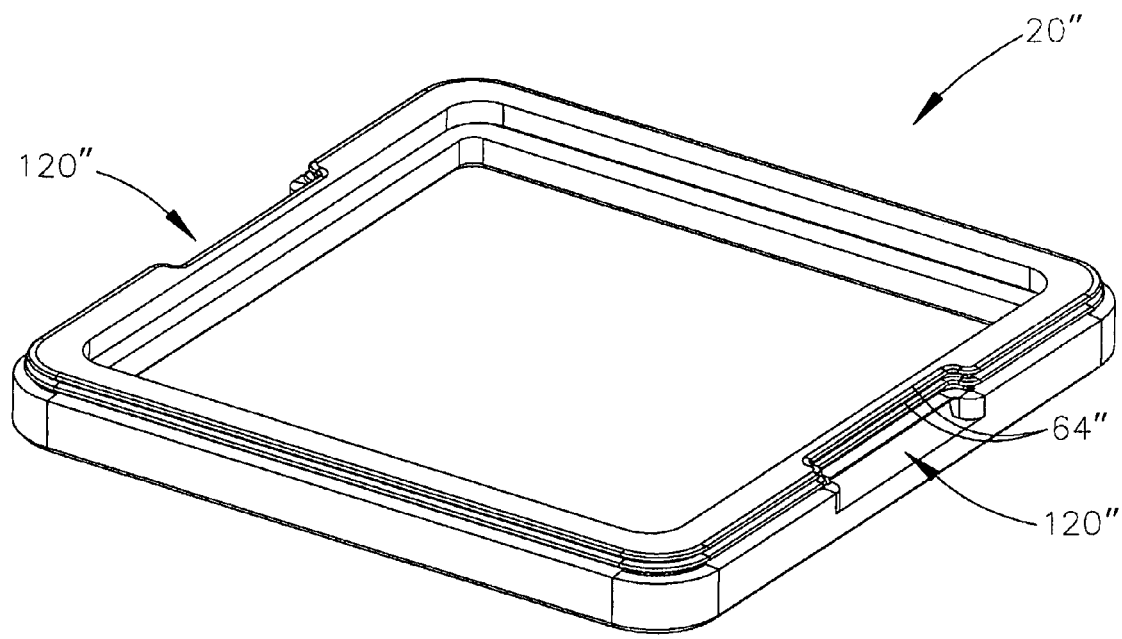
FIG. 24 is a perspective view of a third embodiment of a gasket constructed in accordance with the teachings of the present disclosure.
Figure 25:
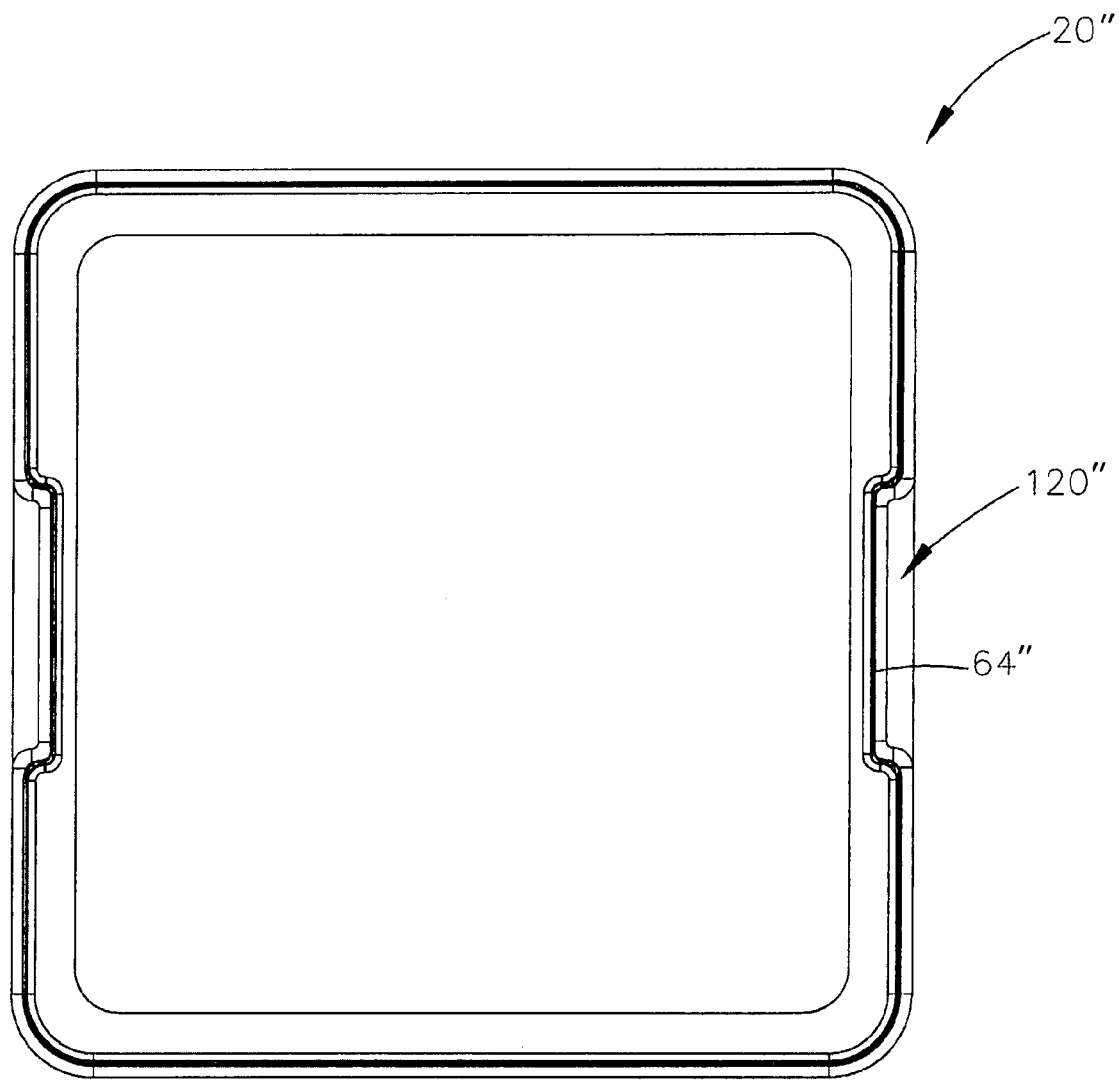
FIG. 25 is a top view of the third gasket in accordance with the teachings of the present disclosure.
Figure 26:
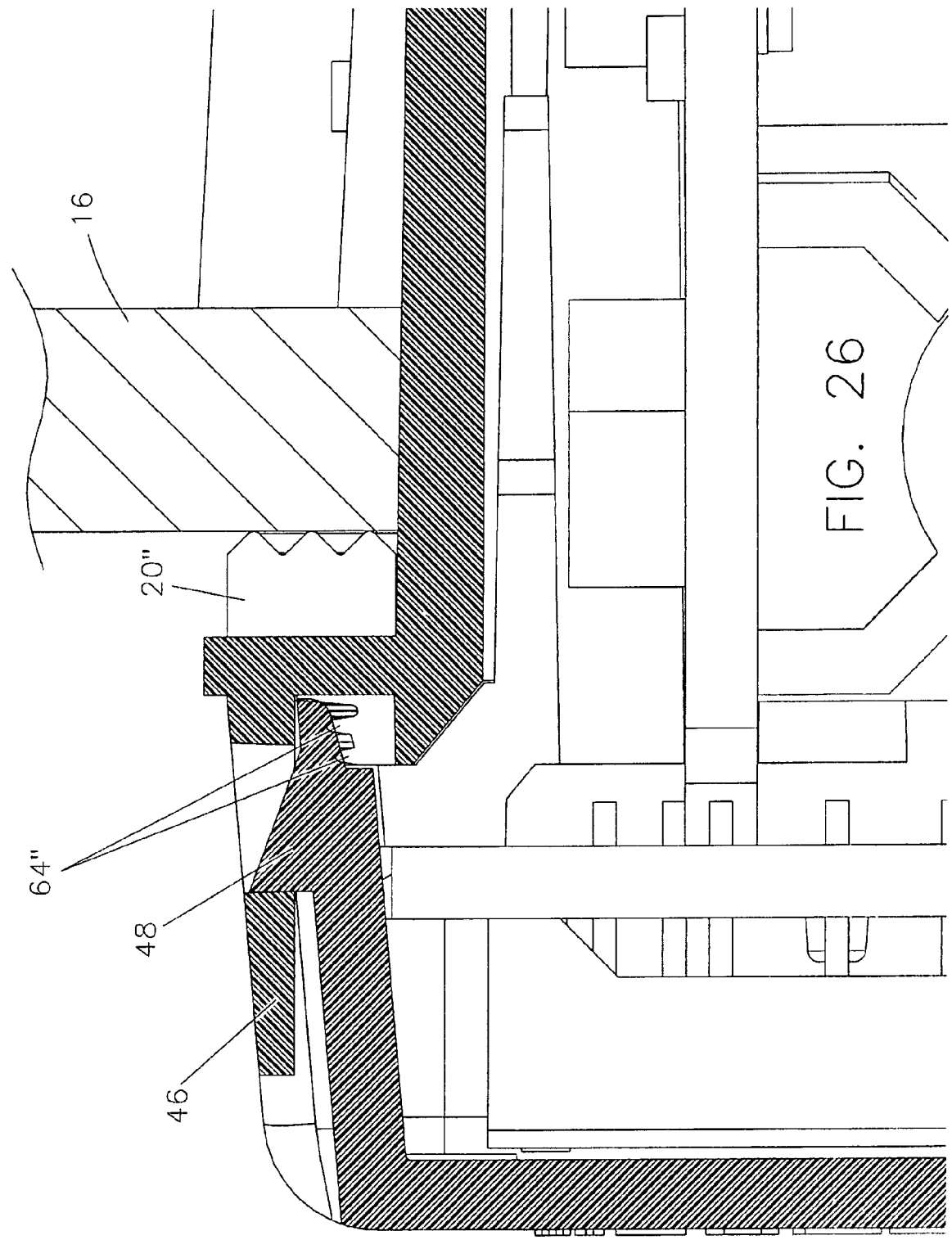
FIG. 26 is an enlarged cross-sectional view of a locking member proximate a recessed portion of the third gasket in accordance with the teachings of the present disclosure.

In yet another form of the gasket 20" as shown in FIGS. 24 through 26, both of the beads 64" extend along the recessed portions 120". While the amount of force required to fully engage the locking tabs 48 is increased, the presence of two beads 64" improves the seal between the locking members 46 and the case 12.

Figure 27:
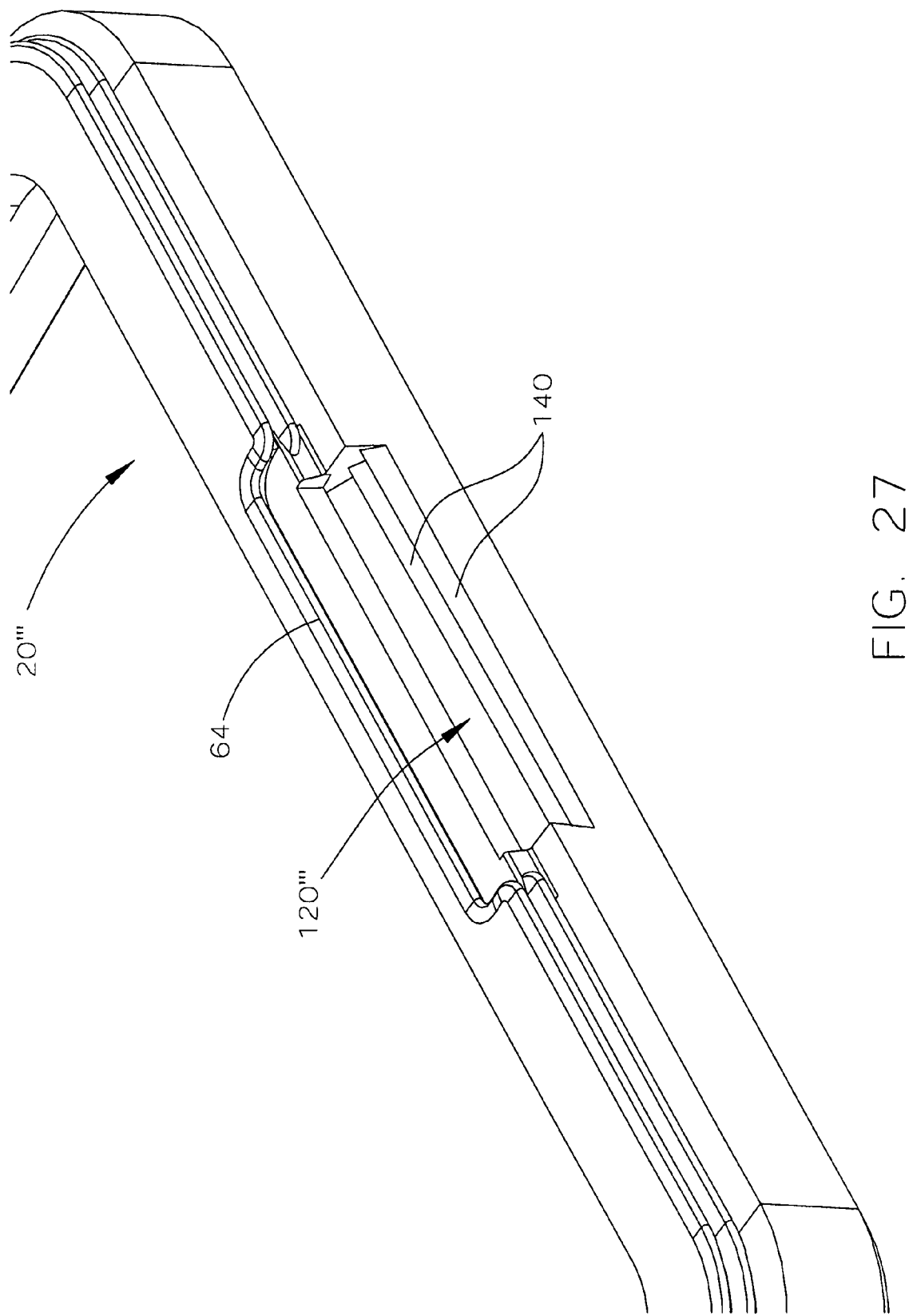
FIG. 27 is an enlarged perspective view of a fourth embodiment of a gasket constructed in accordance with the teachings of the present disclosure.

Referring to FIG. 27, another form of the gasket 20''' is illustrated, wherein the recessed portions 120''' comprise ribs 140 extending along the recessed portions 120''' as shown. The ribs 140 are configured similar to the ribs 72 along the second sealing portion 70 as previously described and are employed to provide an improved sealing interface between the locking tabs 48 and the case 12. The ribs 140 may be employed with or without the beads 64 extending along the recessed portion 120''', and the illustration of only one bead 64 should not be construed as limiting the scope of the present disclosure. Additionally, more or fewer ribs 140 may be employed along any surface of the recessed portion 120''' while remaining within the scope of the present disclosure, and as such, the illustration of two (2) ribs 140 extending along a lower surface of the recessed portion 120''' is merely exemplary and should not be construed as limiting the scope of the present disclosure.

Referring back to FIGS. 2 and 4, the gasket 20 is preferably a single-piece and extends around the entire periphery of the open end 32 of the case 12. The gasket 20 is preferably chemically fused to the case 12 in a molding process, e.g., two-shot injection molding, although a separate gasket 20 may be installed onto the flange 40 while remaining within the scope of the present disclosure. Preferably, the case 12 is a polycarbonate material such as Lexan®, and the gasket 20 is a thermoplastic elastomer such as Santoprene®. As such, the thermoplastic elastomer gasket 20 is specifically formulated to chemically fuse to the polycarbonate case 12. However, these materials are exemplary only and it should be understood that other materials may be employed for the case 12 and the gasket 20 while remaining within the scope of the present disclosure.

Additionally, although two (2) beads 64 and three (3) ribs 72 are illustrated in one form of the present disclosure, it should be understood that more or less of each of the beads 64 and the ribs 72 may be employed while remaining within the scope of the present disclosure.

Figure 28:
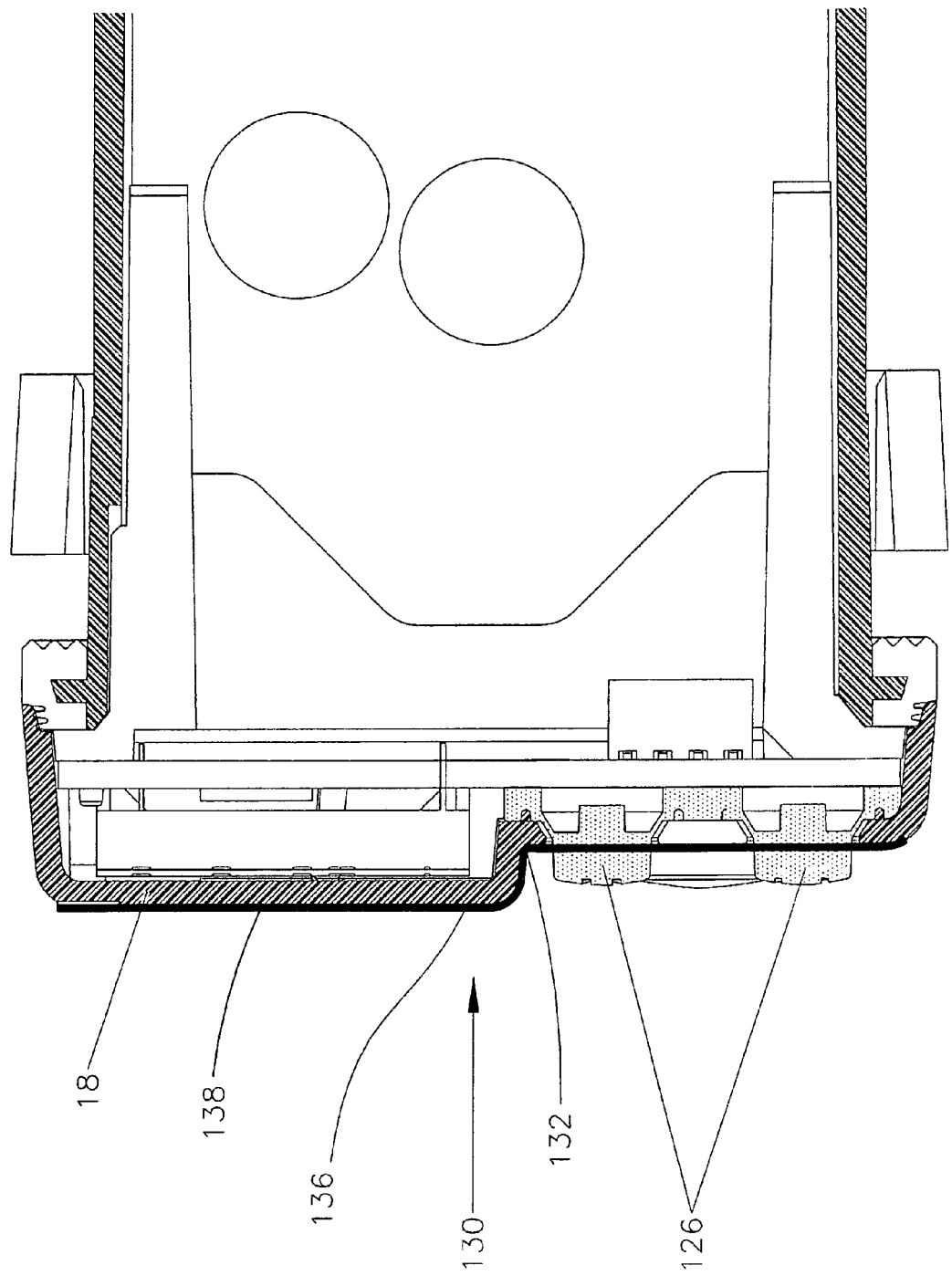
FIG. 28 is a cross-sectional view illustrating a raised surface of the cover constructed in accordance with the teachings of the present disclosure.

Referring now to FIG. 28, the present disclosure also provides protection for the inadvertent engagement of user interface buttons 126 during operation of the housing assembly 10. (The user interface buttons 126 are also shown in greater detail in FIGS. 1 and 3). As shown, the cover 18 further comprises a front face 130 having a first surface 132 through which the user interface buttons 126 are disposed and a raised surface 136 disposed adjacent the first surface 132. Accordingly, front face 130 of the cover 18 defines a profile 138 such that the raised surface 136 provides a barrier against accidental engagement of the user interface buttons 134 since the user interface buttons 134 are recessed relative to the raised surface 136.

Alternate Housing Assemblies

Figure 29:
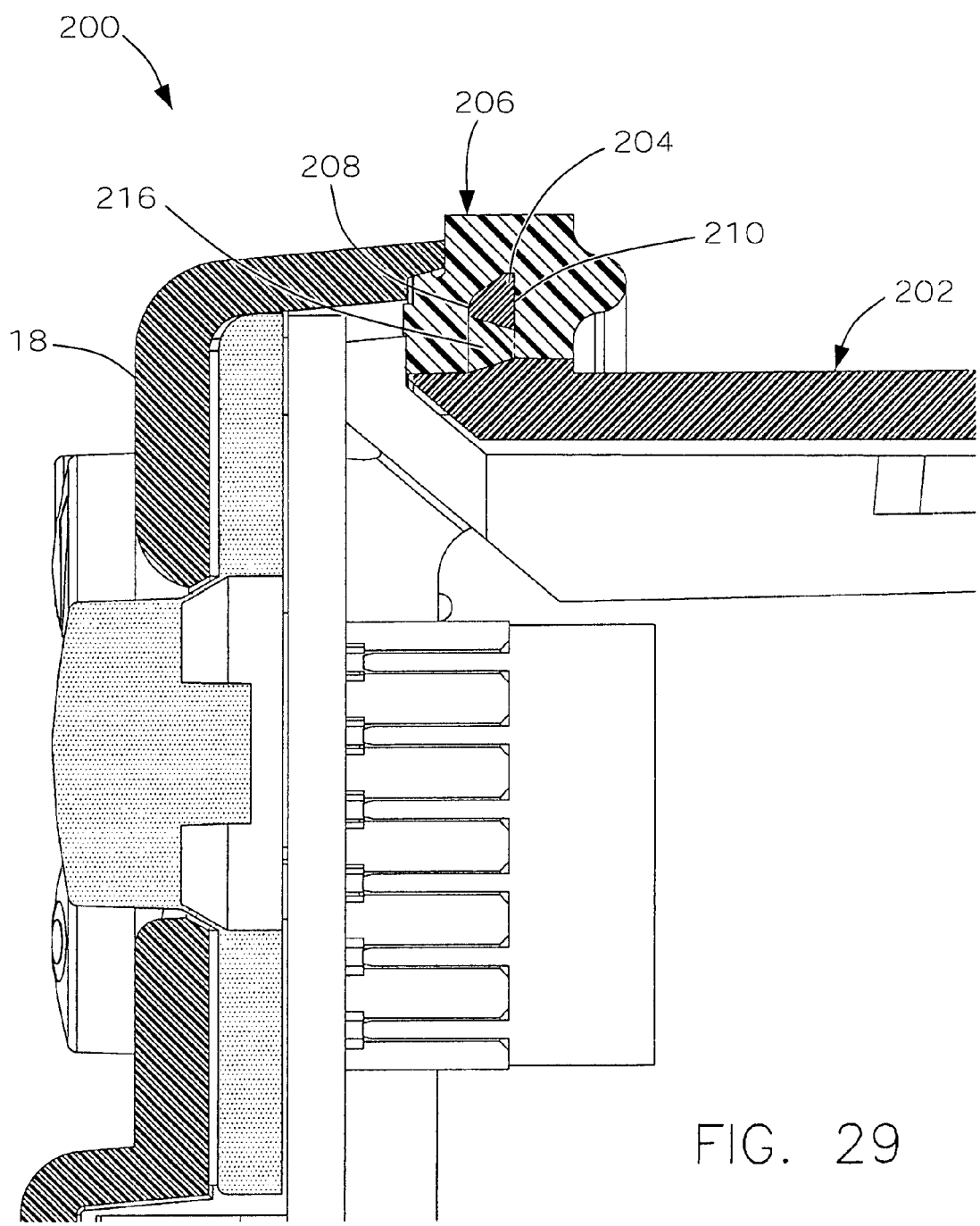
FIG. 29 is an enlarged cross-sectional view (similar to FIG. 14), showing a variant of a housing assembly in accordance with the teachings of the present disclosure.

Referring to FIG. 29, a variation of a housing assembly constructed in accordance with the teachings of the present disclosure is illustrated and generally indicated by reference numeral 200. Similar to the housing assembly described in connection with FIGS. 1 to 28, the housing assembly 200 comprises a case 202 having a flange 204 and a gasket 206 secured to the flange 204 to embed the flange 204 therein. The flange 204 defines a front side 208 facing the cover 18 that closes the case 202, and a rear side 210 opposite the front side 208. Furthermore, the front side 208 and the rear side 210 of the flange 204 define a thickness of the flange 204.

Figure 30:
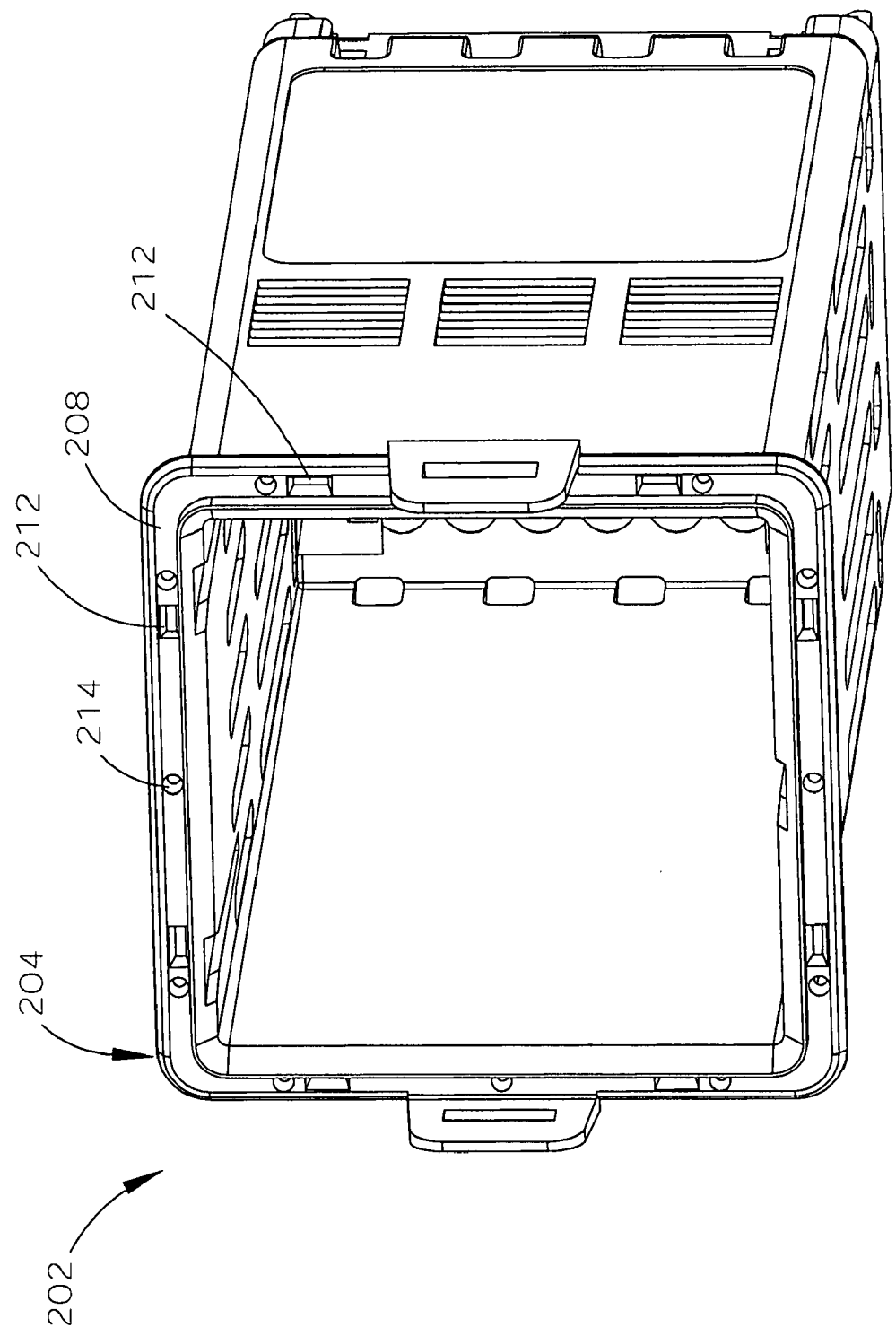
FIG. 30 is a perspective view of a case constructed in accordance with the teachings of the present disclosure.

Unlike the flange 40 previously described in connection with FIGS. 1 to 28, the flange 204 defines at least one reduced area 205 extending into the thickness of the flange 204. As described and illustrated in greater detail below, the "reduced area" as used herein refers to an area where the thickness of the flange 204 is reduced to define, by way of example, an aperture, a recess, or an open channel, among other geometrical shapes or features, for increasing surface area contact between the flange 204 and the gasket 206. More specifically, and by way of example with reference to FIG. 30, the at least one reduced area in one form is a plurality of rectangular apertures 212 and apertures 214 extending between the front side 208 and the rear side 210 of the flange 204. It should be understood that this number and shape of apertures is merely exemplary and thus this illustration should not be construed as limiting the scope of the present disclosure.

Referring back to FIG. 29, the apertures 212 and 214, whether rectangular, circular or other shape(s), allow the material of the gasket 206 to flow through the apertures 212 and 214 during manufacture, which is described in greater detail below. Accordingly, supports 216 are formed across the flange 204 as the gasket 206 is molded around the flange 204. Preferably, the apertures 212 and 214 and the corresponding supports 216 that fill these apertures 212 and 214 define a tapered shape as shown. However, it should be understood the apertures 212 and 214 can define other interior shapes such as a uniform cross-sectional opening while remaining within the scope of the present disclosure.

Figure 31:
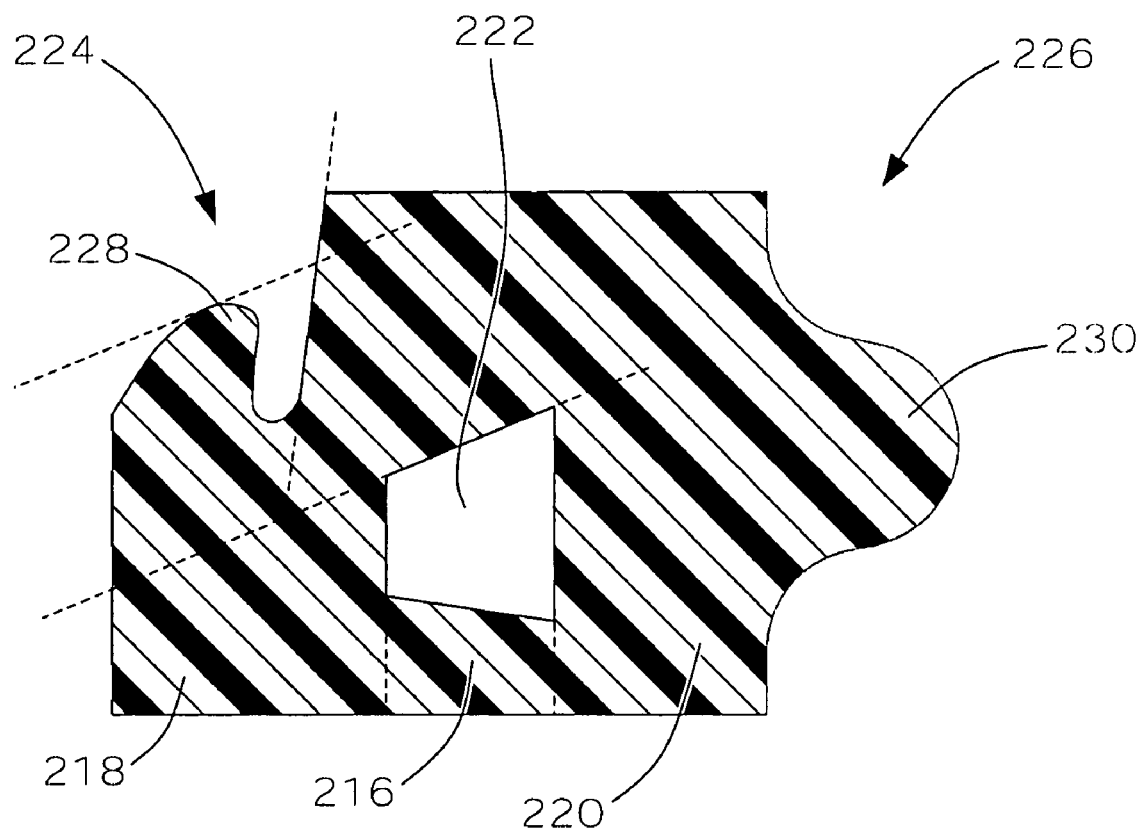
FIG. 31 is an enlarged cross-sectional view of a gasket that is constructed in accordance with the teachings of the present disclosure.

As shown in FIG. 31, the gasket 206 includes a front portion 218, a rear portion 220, and an internal groove 222 for receiving the flange 204 therein. The internal groove 222 preferably has an annular shape as it extends around the opening of the case 202 and is defined between the front portion 218 and the rear portion 220 of the gasket 206. After being formed with the case 202, the supports 216 extend across the internal groove 222 of the gasket 206 to connect the front portion 218 and the rear portion 220 of the gasket 206. As such, the supports 216 function to interlock the front side 216 and the rear side 218 of the gasket 206 to the flange 204 (not shown) against a force imposed by the cover 18 (FIG. 2) when the cover 18 is engaged/disengaged with the housing assembly 200.

As further shown, the gasket 206 also includes a first sealing portion 224 and a second sealing portion 226. The first sealing portion 224 preferably defines a single bead 228 (still retaining the angled profile 62 as previously described), and the second sealing portion 226 preferably defines a single rib 230 as shown. With a single bead and rib structure on the first and the second sealing portions, respectively, the bead 228 and the rib 230 can be fabricated with a wider cross-sectional area, compared with that of the multiple beads and ribs previously described, so that an improved mold flow can be achieved to form the bead 228 and the rib 230 of a desirable shape.

The gasket 206 is preferably formed of a thermoplastic elastomer (TPE), preferably in the range of approximately 25 to approximately 40 durometer. Generally, a TPE having a higher durometer can achieve an improved bond between the gasket 206 and flange 204, but the bead 228 has decreased flexibility for a satisfactory wiping action with the cover 18, which can result in a poor seal. In contrast, a TPE having a lower durometer has enough flexibility to achieve satisfactory sealing with the cover 18, but can result in inadequate bonding between the gasket 206 and the flange 204, thereby increasing the likelihood of separating from the flange 204 or fracture after repeated use.

With the provision of the supports 216 of the gasket 206 to further improve the interlocking of the gasket 206 to the flange 204, a TPE of a lower durometer can be used to achieve a satisfactory sealing action on the first sealing portion 224 and the second sealing portion 230, while preventing separation of the gasket 206 from the flange 204. Accordingly, a TPE having approximately a 30 durometer is preferred.

Figure 32:
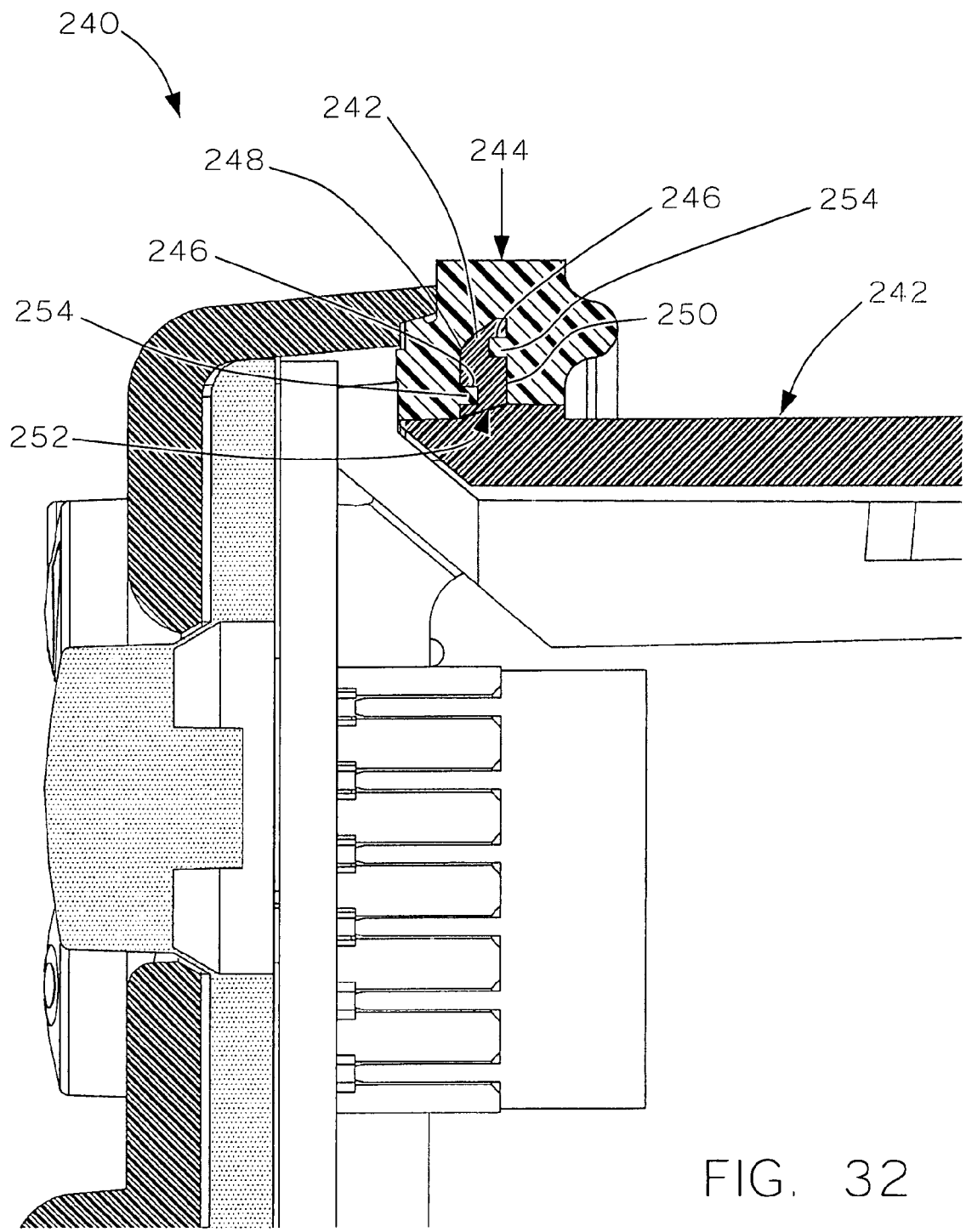
FIG. 32 is an enlarged cross-sectional view (similar to FIG. 29), illustrating another variant of the housing assembly in accordance with the teachings of the present disclosure.

Referring now to FIG. 32, another variant of a housing assembly constructed in accordance with the teachings of the present disclosure is illustrated and generally by reference numeral 240. The housing assembly 240 includes a case 242 having a flange 242 and a gasket 244 disposed around the flange 242. The flange 242 has at least one reduced area in the form of a plurality of recesses 246 formed at the front side 248 and the rear side 250 of the flange 242. The recesses 246 on the front side 248 and the rear side 250 can be arranged to have the same distance or different distance from the root portion 252 of the flange 242. The recesses 246 allow a material of the gasket 244 to flow into the recesses 246 during manufacture (as described in greater detail below) to form a plurality of protrusions 254. Similar to the supports 216 as previously described, these protrusions 254 provide improved interlocking between the gasket 244 and the flange 242 against separation due to the engaging and disengaging of the cover 18 to the housing assembly 200.

While the recesses 246 are shown to be formed on both the front side 248 and the rear side 250 of the flange 242, it should be understood and appreciated that the recesses 246 can be formed on only one side of the flange 246 without departing from the scope of the present disclosure.

Figure 33:
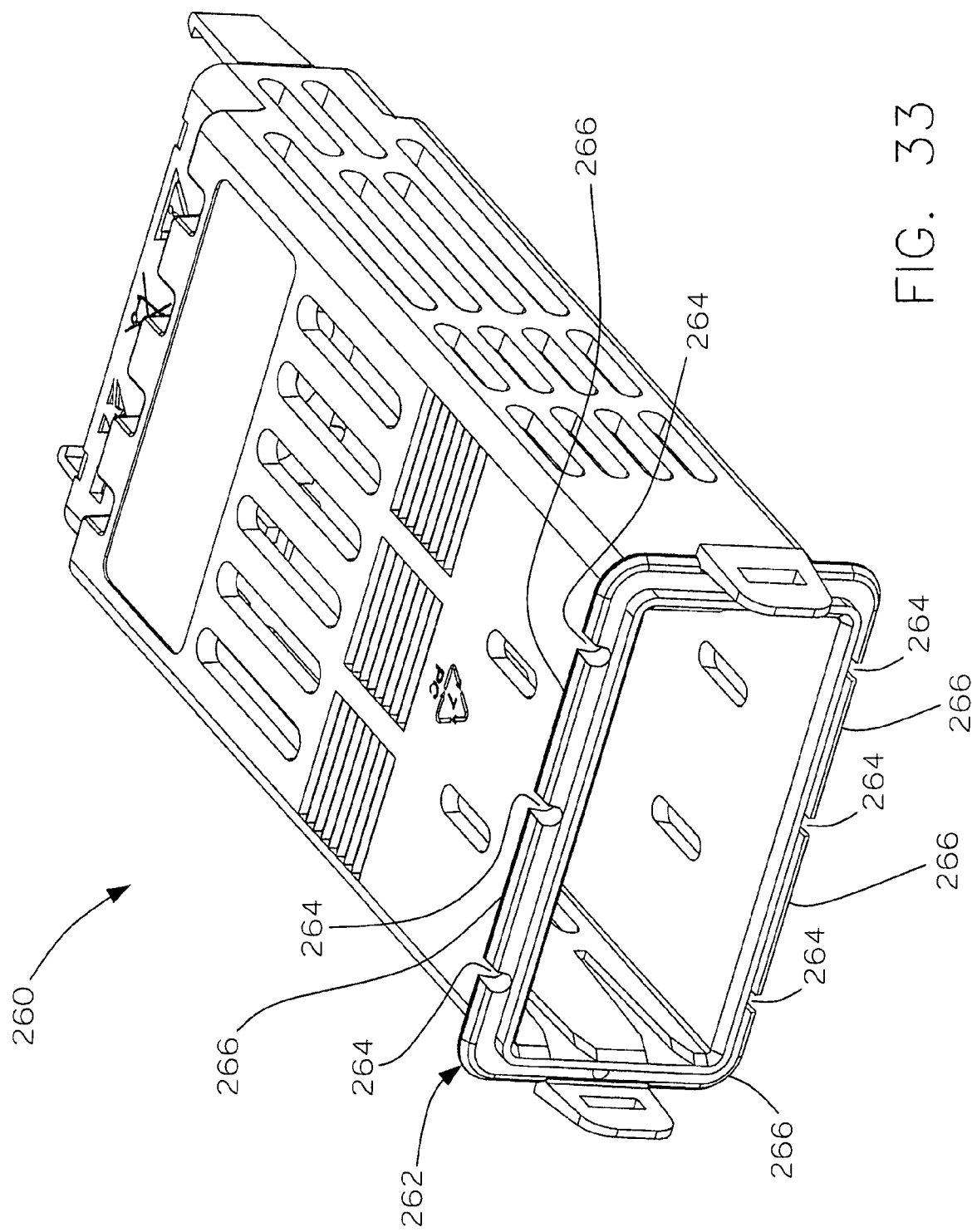
FIG. 33 is a perspective view of another variant of a case constructed in accordance with the teachings of the present disclosure.
Figure 34:
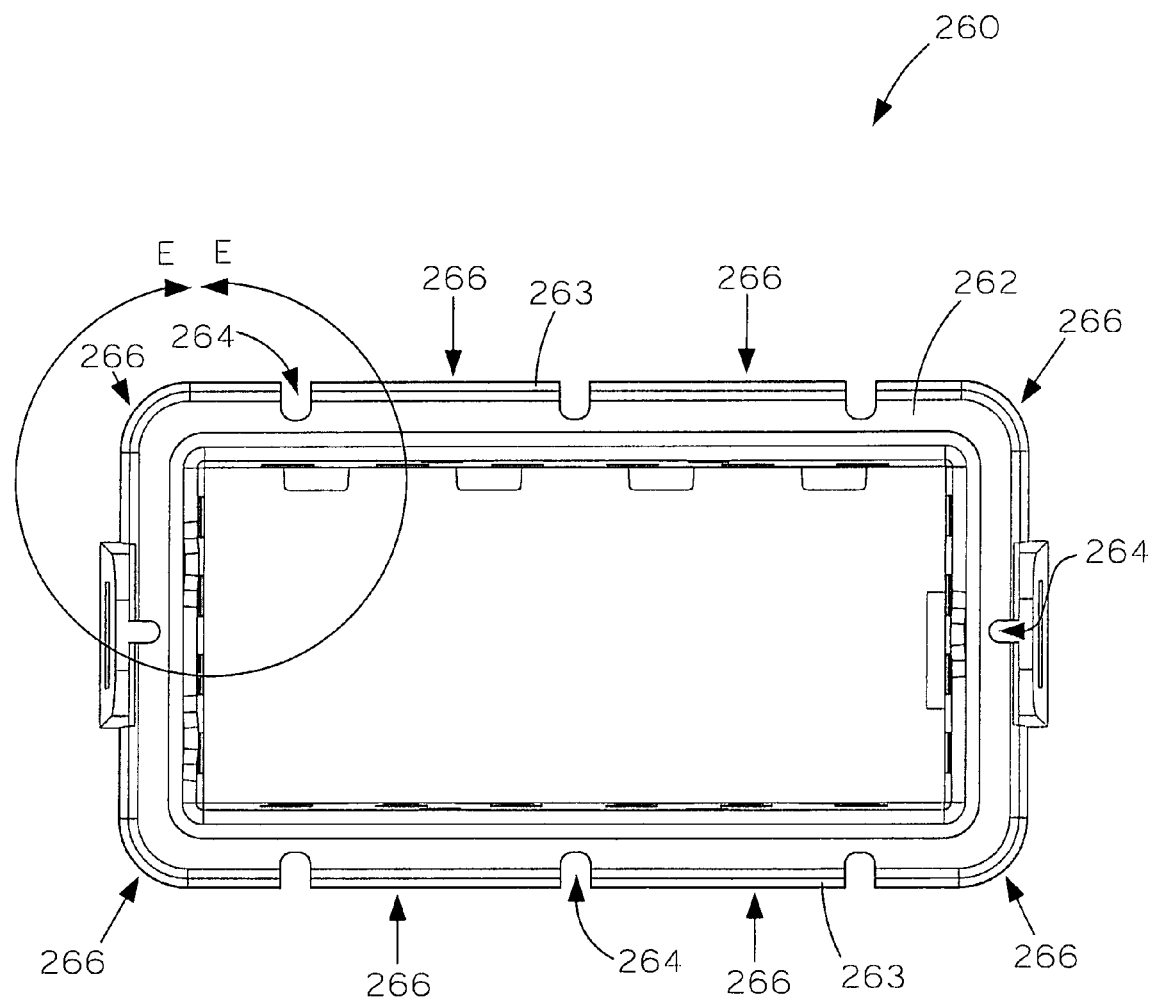
FIG. 34 is a front view of the case of FIG. 33, illustrating the geometry of a reduced area in accordance with the teachings of the present disclosure.

Still another variant of the case is illustrated in FIGS. 33 and 34, and is generally indicated by reference numeral 260. The case 260 includes a flange 262 defining at least one reduced area in the form of open channels 264 and a plurality of sections 266 between the open channels 264. Unlike the continuous flanges described in connection with FIGS. 1 to FIG. 32, the flange 262 is discontinuous along it upper portion 263 and includes multiple sections 266 as shown. During molding, a part of the material that forms the gasket (not shown in FIG. 33) flows through the open channels 264 to connect the front portion and the rear portion of the gasket. The bonding force of the gasket to the flange is thus improved due to the increased surface area contact between the flange 262 and the gasket.

Figure 35A:
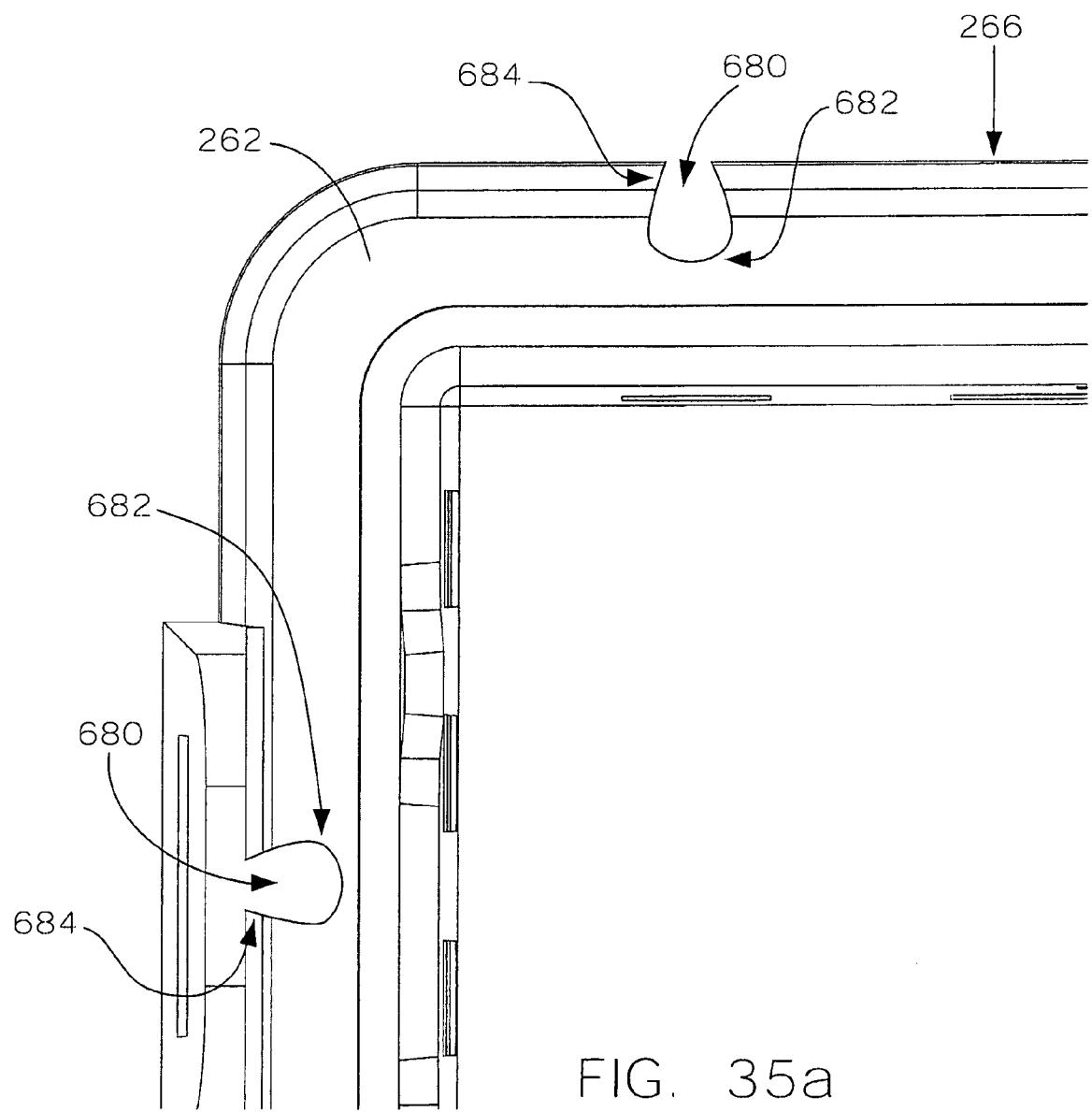
FIG. 35a is a an enlarged view, within detail E of FIG. 34 of an alternate geometry for a reduced area in accordance with the teachings of the present disclosure.
Figure 35B:
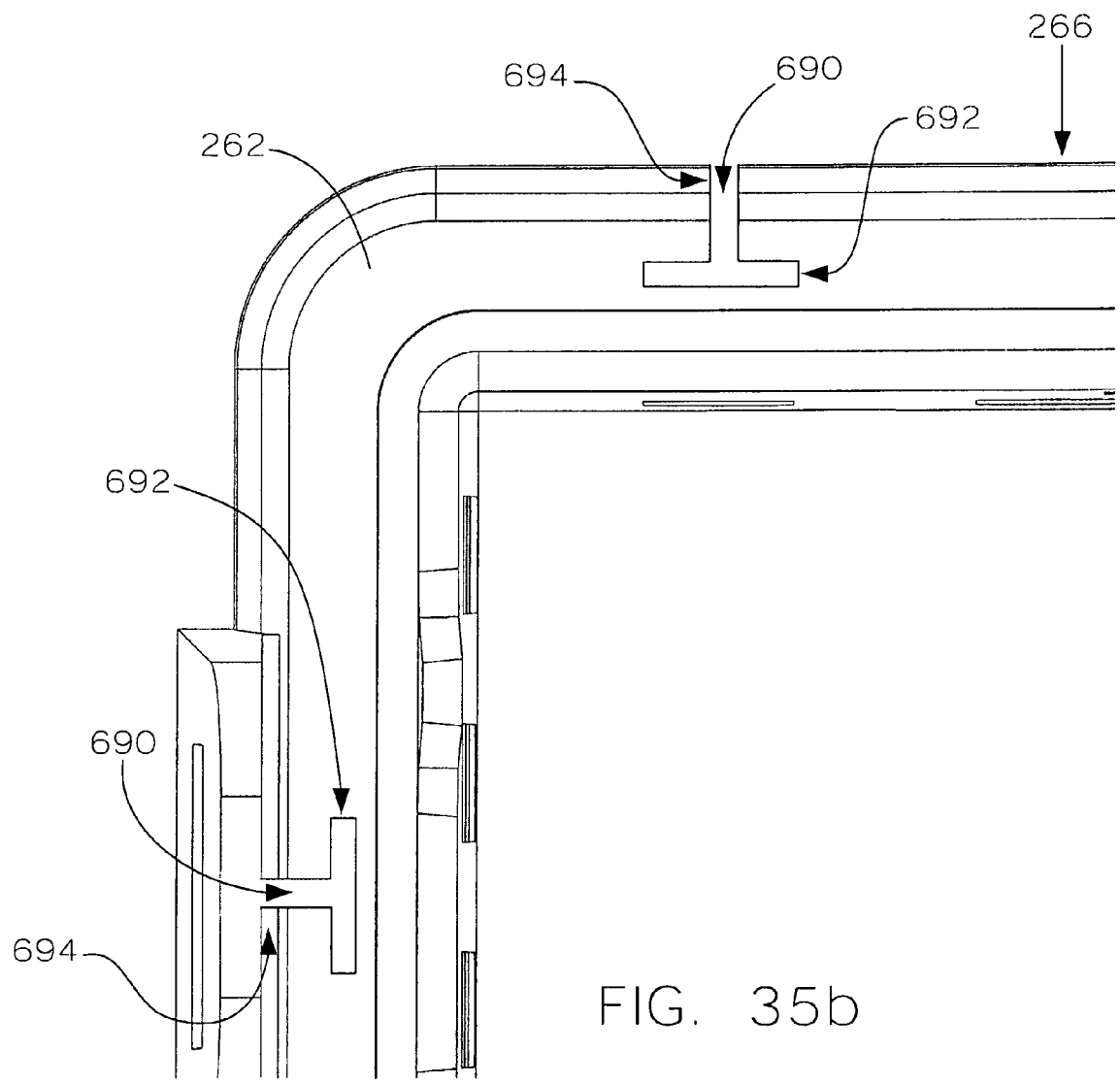
FIG. 35b is a an enlarged view, within detail E of FIG. 34 of another alternate geometry for a reduced area in accordance with the teachings of the present disclosure.
Figure 35C:
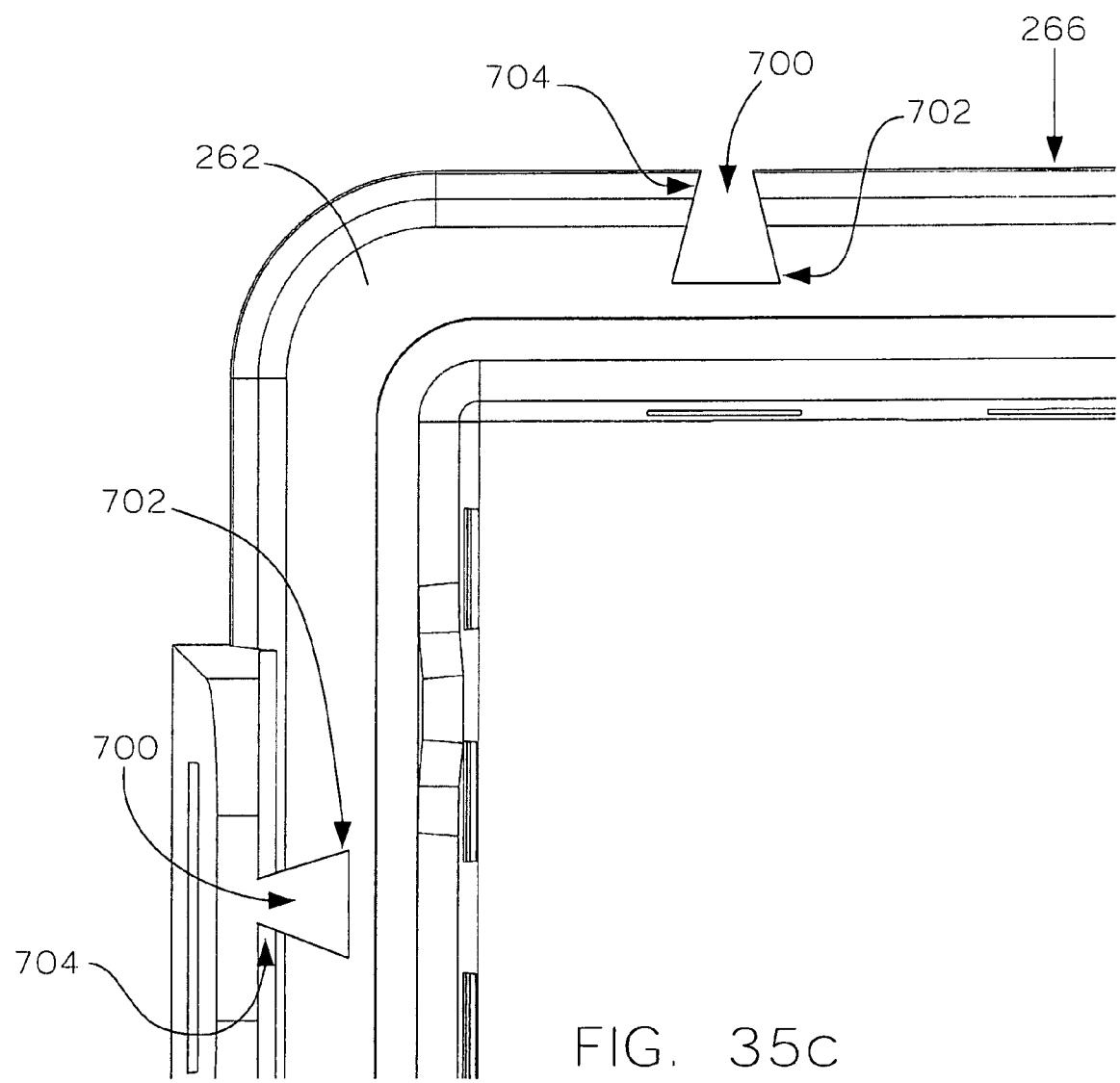
FIG. 35c is a an enlarged view, within detail E of FIG. 34 of yet another alternate geometry for a reduced area in accordance with the teachings of the present disclosure.

As shown in FIGS. 35a through 35c, variants of the reduced area for the discontinuous flange 262 having a plurality of sections 266 are now described in greater detail. In FIG. 35a, the reduced area is in the form of a "horseshoe" 680, wherein a lower portion 682 of the "horseshoe" 680 is generally greater in width or size than an upper portion 684 of the "horseshoe" 680. As such, the material of the gasket (not shown) that flows into the reduced area during manufacture will have a tendency to "lock" into place and will be more resistant to separation from the insertion and removal forces as previously described.

Referring to FIG. 35b, another variant of the reduced area is in the form of an inverted "T" 690, wherein a lower portion 692 of the "T" 690 is generally greater in width or size than an upper portion 694 of the "T" 690. Similar to the "horseshoe" 680 as illustrated and described above, the material of the gasket (not shown) that flows into the "T"-shaped reduced area 690 during manufacture will have a tendency to "lock" into place and will be more resistant to separation from the insertion and removal forces as previously described.

Referring also to FIG. 35c, another form of a reduced area is a "dovetail" 700, wherein a lower portion 702 of the "dovetail" 700 is generally greater in width or size than an upper portion 704 of the "dovetail" 700. Similar to the previous reduced areas as illustrated and described above, the material of the gasket (not shown) that flows into the "dovetail"-shaped reduced area 700 during manufacture will have a tendency to "lock" into place and will be more resistant to separation from the insertion and removal forces as previously described.

It should be understood that a variety of geometries other than those illustrated and described in FIGS. 35a through 35c may be employed while remaining within the scope of the present disclosure. Accordingly, the illustrated and described geometries for the reduced area are exemplary in nature and should not be construed as limiting the scope of the present disclosure. Although not illustrated herein, it should also be understood that the discontinuous flange 262 may alternately be discontinuous along its entire height, rather than only along the upper portion 263, such that individual sections of flange 262 would be disposed around the opening of the case 260.

Manufacture

Figure 36:
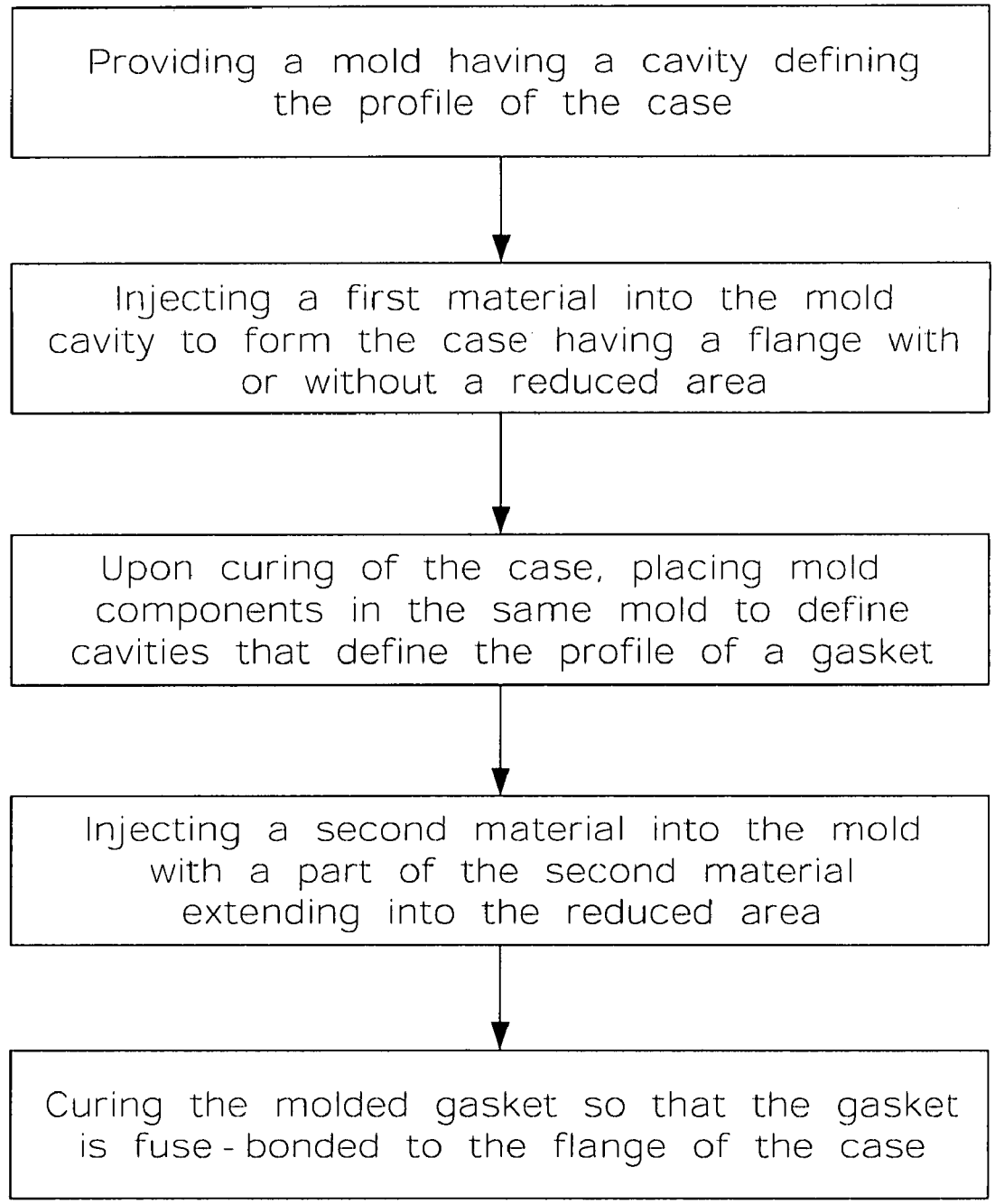
FIG. 36 is a flow diagram illustrating a method of manufacturing the housing assembly in accordance with the teachings of the present disclosure.

Referring to FIG. 36, a method of manufacturing the housing assembly 200 is now described in greater detail. The method generally includes a double-shot injection molding process, wherein both the case and the gasket are molded in the same process. More specifically, a mold which has a cavity defining the geometry of the case, is first provided. By injecting a material into the mold cavity, the case is formed. The case includes a flange of a predetermined configuration with the at least one reduced area as illustrated and described herein. Next, without removing the case from the mold, the mold is rotated into another cavity, which defines the geometry of the gasket. Then, a second material is injected into the same mold to form the gasket. During molding, a part of the second material for the gasket flows into the reduced area(s), such as, by way of example, the rectangular apertures, circular apertures, recesses or open channels, thereby forming a plurality of supports or protrusions into the flange. Upon curing, the gasket is molded and secured to the flange.

It should be understood and appreciated that while a double-shot molding method has been described, the housing assembly including the case and the gasket can be formed in separate molds and by other processes such as, by way of example, injection molding, compression molding, or blow molding, among others.

The present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A housing assembly comprising:
   a case including an open end and a flange extending around at least a portion of the open end, the flange defining at least one aperture extending through a portion of the flange; and
   a gasket disposed around the flange and comprising:
      a first sealing portion;
      a second sealing portion;
      an internal groove for receiving the flange; and
      at least one support extending across the internal groove and through the at least one aperture of the flange.

2. The housing assembly of claim 1, wherein the flange defines a continuous piece.

3. The housing assembly of claim 1, wherein the flange is discontinuous along an upper portion of the flange and includes a plurality of sections.

4. The housing assembly according to claim 3, wherein the flange comprises at least one reduced area defining a lower portion that is greater in width than an upper portion.

5. The housing assembly according to claim 4, wherein the reduced area is selected from a group consisting of a horseshoe, an inverted T, and a dovetail geometry.

6. The housing assembly of claim 1, wherein the flange defines a plurality of apertures.

7. The housing assembly of claim 6, wherein the plurality of apertures define a rectangular shape.

8. The housing assembly of claim 6, wherein the plurality of apertures define cylindrical shapes and rectangular shapes.

9. The housing assembly of claim 1, wherein the first sealing portion includes at least one bead and the second sealing portion includes at least one rib.

10. The housing assembly of claim 1, wherein the first sealing portion includes a plurality of beads and the second sealing portion includes a plurality of ribs, the plurality of beads defining an angled profile.

11. The housing assembly according to claim 1 wherein the gasket is made of a thermoplastic elastomer having a durometer in the range of approximately 25 to approximately 40.

12. The gasket according to claim 11, wherein the gasket is made of a thermoplastic elastomer having a durometer of approximately 30.

13. A housing assembly comprising:
- a case comprising a flange extending around at least a portion of the case, the flange defining at least one reduced area extending into a portion of the flange; and
- a gasket disposed around the flange and comprising an internal groove for receiving the flange and at least one member extending into the internal groove and into the at least one reduced area of the flange.

14. The housing assembly of claim 13, wherein the reduced area is an aperture and the member is a support extending across the internal groove and through the aperture.

15. The housing assembly of claim 13, wherein the reduced area is a recess and the member is a protrusion extending into the internal groove and into the recess.

16. The housing assembly of claim 13, wherein the reduced area is on one side of the flange.

17. The housing assembly of claim 13, wherein the reduced area is on both sides of the flange.

18. The housing assembly of claim 13, wherein the flange defines a continuous piece.

19. The housing assembly of claim 13, wherein the flange is discontinuous along an upper portion of the flange and includes a plurality of sections.

20. The housing assembly according to claim 19, wherein the flange comprises at least one reduced area defining a lower portion that is greater in width than an upper portion.

21. The housing assembly according to claim 20, wherein the reduced area is selected from a group consisting of a horseshoe, an inverted T, and a dovetail geometry.

22. The housing assembly of claim 13, wherein the gasket further comprises a first sealing portion and a second sealing portion.

23. The housing assembly of claim 22, wherein the first sealing portion includes at least one bead and the second sealing portion includes at least one rib.

24. The housing assembly of claim 22, wherein the first sealing portion includes a plurality of beads and the second sealing portion includes a plurality of ribs, the plurality of beads defining an angled profile.

25. A gasket adapted for use with a case of an electrical enclosure assembly, the gasket comprising:
- a first sealing portion for providing sealing between the case and a first adjacent component;
- a second sealing portion for providing sealing between the case and a second adjacent component,
- wherein the gasket is made of a thermoplastic elastomer having a durometer in the range of approximately 25 to approximately 40, and the gasket defines a groove for receiving a flange of the case so that the gasket can be secured to the flange, wherein a plurality of protrusions extend into the groove.

* * * * *

UNITED STATES PATENT AND TRADEMARK OFFICE
CERTIFICATE OF CORRECTION

PATENT NO.        : 7,423,217 B2
APPLICATION NO.   : 11/706051
DATED             : September 9, 2008
INVENTOR(S)       : Robert Pape et al.

It is certified that error appears in the above-identified patent and that said Letters Patent is hereby corrected as shown below:

<u>On the Title Page</u>

Item (54), after "THEREOF IN" delete "A" and substitute --AN-- in its place.

In column 1, in the title, after "THEREOF IN" delete "A" and substitute --AN-- in its place.

Signed and Sealed this

Twentieth Day of January, 2009

JON W. DUDAS
*Director of the United States Patent and Trademark Office*